United States Patent
Hasegawa et al.

(10) Patent No.: US 11,366,477 B2
(45) Date of Patent: Jun. 21, 2022

(54) INFORMATION PROCESSING DEVICE, INFORMATION PROCESSING METHOD, AND COMPUTER READABLE MEDIUM

(71) Applicant: MITSUBISHI ELECTRIC CORPORATION, Tokyo (JP)

(72) Inventors: Takefumi Hasegawa, Tokyo (JP); Masahiro Abukawa, Tokyo (JP); Shu Murayama, Tokyo (JP); Yohei Miki, Tokyo (JP); Michinori Yoshida, Tokyo (JP); Kentaro Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 277 days.

(21) Appl. No.: 16/475,576

(22) PCT Filed: Mar. 15, 2017

(86) PCT No.: PCT/JP2017/010502
§ 371 (c)(1),
(2) Date: Jul. 2, 2019

(87) PCT Pub. No.: WO2018/167891
PCT Pub. Date: Sep. 20, 2018

(65) Prior Publication Data
US 2021/0173400 A1 Jun. 10, 2021

(51) Int. Cl.
*G05D 1/02* (2020.01)
*G06V 20/13* (2022.01)

(52) U.S. Cl.
CPC .......... *G05D 1/0214* (2013.01); *G05D 1/0246* (2013.01); *G05D 1/0297* (2013.01); *G06V 20/13* (2022.01)

(58) Field of Classification Search
CPC .. G05D 1/0214; G05D 1/0246; G05D 1/0297; G06K 9/0063; B62D 15/0285;
(Continued)

(56) References Cited

U.S. PATENT DOCUMENTS

2015/0077563 A1* 3/2015 Niemz ................ G06K 9/3258
348/148
2015/0353080 A1 12/2015 Mukaiyama
(Continued)

FOREIGN PATENT DOCUMENTS

JP 2010-117800 A 5/2010
JP 2012-126193 A 7/2012
(Continued)

OTHER PUBLICATIONS

International Search Report (PCT/ISA/210) issued in PCT/JP2017/010502, dated Jun. 6, 2017.

*Primary Examiner* — Rodney A Butler
(74) *Attorney, Agent, or Firm* — Birch, Stewart, Kolasch & Birch, LLP

(57) ABSTRACT

A first image-data acquisition unit (101) acquires a plurality of pieces of image data in which different areas in a facility in which an autonomous driving vehicle conducts autonomous traveling are shown. A priority setting unit (102) analyzes a status shown in each of the plurality of pieces of image data and sets a priority to each image data. A first image-data display unit (103) decides a display mode at a time of displaying the plurality of pieces of image data according to the priority set by the priority setting unit (102).

9 Claims, 25 Drawing Sheets

(58) Field of Classification Search
CPC ...... G08G 1/0116; G08G 1/0145; G08G 1/04; G08G 1/143; G08G 1/146; G08G 1/005; H04N 7/18
See application file for complete search history.

(56) References Cited

U.S. PATENT DOCUMENTS

| | | |
|---|---|---|
| 2016/0144857 A1 | 5/2016 | Ohshima |
| 2016/0272244 A1 | 9/2016 | Imai et al. |
| 2017/0132482 A1* | 5/2017 | Kim ........................ B60K 35/00 |
| 2018/0170367 A1 | 6/2018 | Ohshima |
| 2018/0178766 A1 | 6/2018 | Oba |
| 2018/0178840 A1* | 6/2018 | Li ........................ B60W 30/06 |

FOREIGN PATENT DOCUMENTS

| | | |
|---|---|---|
| JP | 2015-72651 A | 4/2015 |
| JP | 2015-81022 A | 4/2015 |
| JP | 2015-228152 A | 12/2015 |
| JP | 2015-230641 A | 12/2015 |
| JP | 2016-99953 A | 5/2016 |
| JP | 2016-173682 A | 9/2016 |
| WO | WO 2017/002471 A1 | 1/2017 |

* cited by examiner

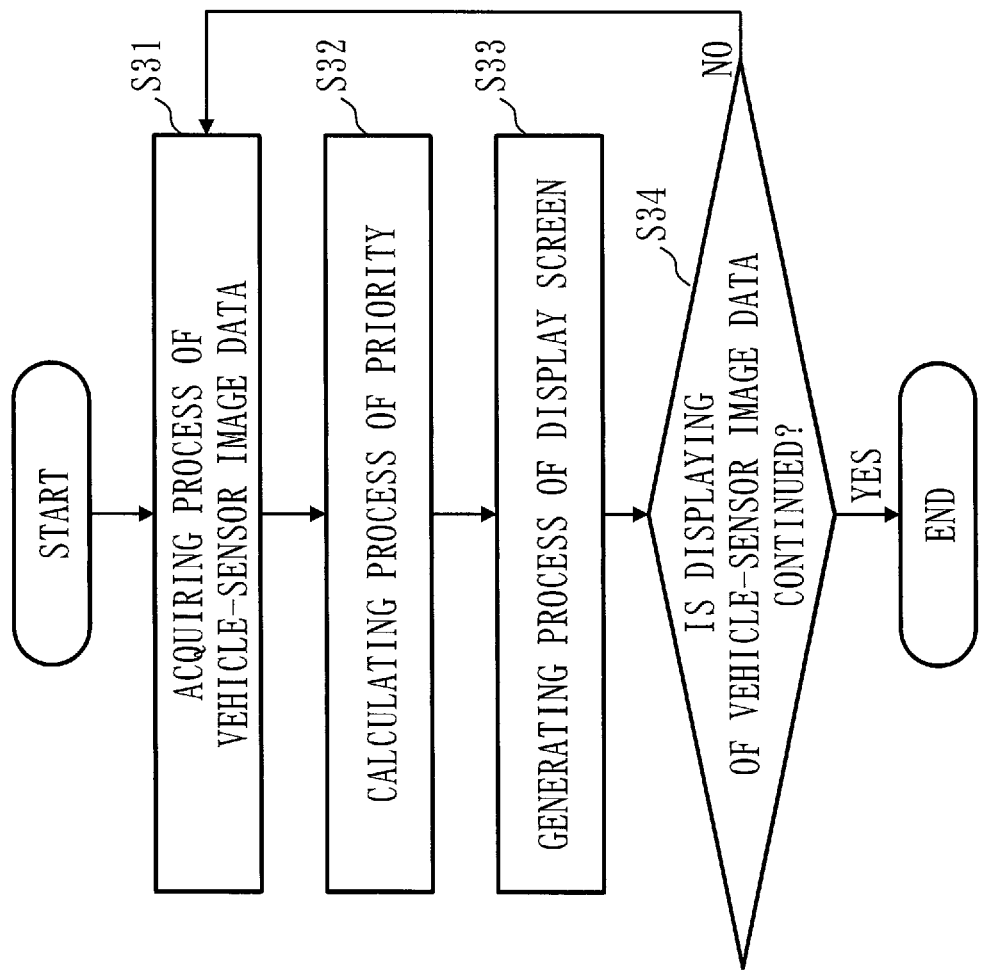

INFORMATION PROCESSING DEVICE, INFORMATION PROCESSING METHOD, AND COMPUTER READABLE MEDIUM

TECHNICAL FIELD

The present invention relates to monitoring of autonomous driving vehicles.

BACKGROUND ART

In recent years, an ADAS (Advanced Driver Assistance System) represented by automatic braking, Adaptive Cruise Control, and the like has been on the market. Further, research and development of the autonomous driving and traveling technology has been in progress, and a plurality of automobile manufactures have been running demonstration trials on public roads. Research and development of the automatic parking technology has been actively conducted as a part of the autonomous driving and traveling technology, and a plurality of automobile manufacturers have been marketing vehicles with an automatic parking function incorporated therein.

In most of automatic parking functions, when a driver selects a parking position on a touch panel, the vehicle autonomously travels to be parked at the selected parking position.

A valet parking service is provided at hotels and restaurants in some cases. In valet parking, when a key of a vehicle is handed to a manager at a hotel entrance or a restaurant entrance, the manager parks the vehicle on behalf of the driver. When the valet parking is to be realized by an automatic parking function, the vehicle needs to travel autonomously in an unmanned state. Due to the advancement of autonomous driving technology, unmanned automatic parking can be conducted in normal cases. However, when the parking lot is congested, in order to secure safety, there is a case where each of autonomous driving vehicles stops its traveling. Further, when both autonomous driving vehicles and manual driving vehicles are present in a mixed manner in a parking lot, automatic parking becomes more difficult as compared to a case where there are only autonomous driving vehicles.

As described above, when a parking lot is congested and when autonomous driving vehicles and manual driving vehicles are present in a mixed manner in a parking lot, automatic parking becomes difficult. When such circumstances are assumed, it is necessary that the automatic parking function of an autonomous driving vehicle is assisted by human so as not to cause any accident.

In this regard, Patent Literature 1 discloses a parking assistance system. In Patent Literature 1, images captured by a vehicle-mounted camera of a vehicle to be parked are transmitted to a manager of a parking lot. The manager monitors the images captured by the vehicle-mounted camera, drives the vehicle on behalf of its driver with simulated steering, and parks the vehicle.

Due to the technology of Patent Literature 1, the manager of the parking lot can drive the vehicle on behalf of its driver even when the manager is at a location away from the parking lot.

Patent Literature 2 discloses a technology of stopping an autonomous driving vehicle using a smartphone. In Patent Literature 2, a driving-status notification image indicating a position of an autonomous driving vehicle and persons and obstacles around the autonomous driving vehicle is presented on a smartphone of a driver. When the driver judges that it is necessary to stop the autonomous driving vehicle, the driver operates a stop button to stop the autonomous driving vehicle.

Due to the technology of Patent Literature 2, it is possible that the driver confirms the driving status of the autonomous driving vehicle that is conducting automatic parking and operates a stop button when there is a danger, thereby stopping the autonomous driving vehicle.

CITATION LIST

Patent Literature

Patent Literature 1: JP 2012-126193 A
Patent Literature 2: JP 2016-99953 A

SUMMARY OF INVENTION

Technical Problem

In the technologies of Patent Literatures 1 and 2, one manager needs to perform driving assistance for one autonomous driving vehicle. Therefore, in the technology of Patent Literature 1 and the technology of Patent Literature 2, there is a problem that in a facility such as a parking lot, when the number of autonomous driving vehicles becomes large, assistance provided by the manager becomes insufficient, and the possibility of occurrence of an accident caused by autonomous driving vehicles that are conducting automatic parking in the facility such as a parking lot becomes high.

The present invention has a main object to solve the problem described above. More specifically, the main object of the present invention is to obtain a configuration that effectively prevents accidents caused by autonomous driving vehicles in a facility.

Solution to Problem

An information processing device according to the present invention includes:

an image-data acquisition unit to acquire a plurality of pieces of image data in which different areas in a facility in which an autonomous driving vehicle conducts autonomous traveling are shown;

a priority setting unit to analyze a status shown in each of the plurality of pieces of image data and to set a priority to each image data; and a display control unit to decide a display mode at a time of displaying the plurality of pieces of image data according to the priority set by the priority setting unit.

Advantageous Effects of Invention

According to the present invention, one manager can perform driving assistance for a plurality of autonomous driving vehicles and accidents caused by autonomous driving vehicles in a facility can be effectively prevented.

BRIEF DESCRIPTION OF DRAWINGS

FIG. 25 is a flowchart illustrating an operation example of the monitoring device according to the second embodiment.

DESCRIPTION OF EMBODIMENTS

Embodiments of the present invention will be explained below with reference to the drawings. In the following descriptions of the embodiments and the drawings, elements denoted by the same reference signs indicate the same or corresponding parts.

First Embodiment

*Descriptions of Configurations*

In the present embodiment, a system for managing a facility in which autonomous driving vehicles travel autonomously is described. Examples of the facility in which autonomous driving vehicles travel autonomously include a parking facility, a warehouse, and a plant.

In the following descriptions, a parking management system for managing a parking facility is explained.

Figure 1:
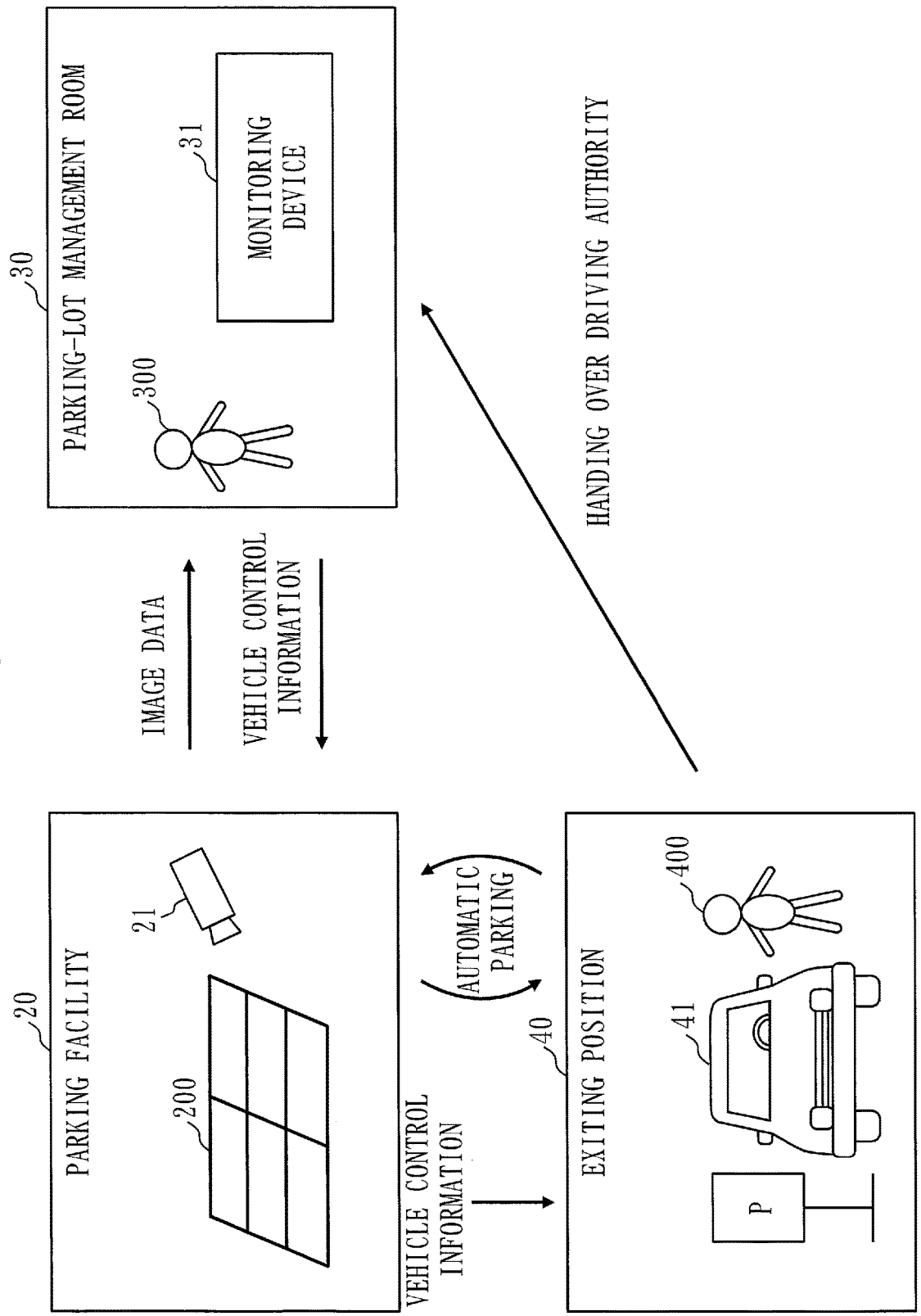
FIG. 1 is a diagram illustrating a configuration example of a parking-lot management system according to a first embodiment.

FIG. 1 illustrates a configuration example of a parking-lot management system according to the present embodiment.

A parking facility 20 includes a parking lot 200.

In the parking lot 200, one or more autonomous traveling vehicles conduct autonomous traveling and conduct automatic parking.

A facility sensor device 21 is installed in the parking facility 20. The facility sensor device 21 monitors the parking lot 200. The facility sensor device 21 is, for example, a camera sensor (a monitoring camera), an infrared sensor, or an optical radar sensor. Although only one facility sensor device 21 is illustrated in FIG. 1, a plurality of facility sensor devices 21 are installed in the parking facility 20. Each of the facility sensor devices 21 monitors different areas in the parking lot 200. Each of the facility sensor devices 21 transmits image data (hereinafter, facility-sensor image data) obtained by monitoring to a monitoring device 31 in a parking-lot management room 30 that is described below.

The parking-lot management room 30 is a room for managing the parking facility 20. In the present embodiment, the parking-lot management room 30 is at a location away from the parking facility 20. Note that the parking-lot management room 30 may be at a location close to the parking facility 20.

In the parking-lot management room 30, the monitoring device 31 receives plurality of pieces of facility-sensor image data transmitted from the plurality of facility sensor devices 21, and sets a priority to each of the received a plurality of pieces of facility-sensor image data. The monitoring device 31 decides a display mode at the time of displaying the plurality of pieces of facility-sensor image data based on the priority. Subsequently, the monitoring device 31 displays the plurality of pieces of facility-sensor image data in the decided display mode. Further, the monitoring device 31 transmits a control instruction from a manager 300 to autonomous traveling vehicles in the parking lot 200.

The manager 300 uses the monitoring device 31. More specifically, the manager 300 views the plurality of pieces of facility-sensor image data displayed on the monitoring device 31 to recognize the status of the autonomous traveling vehicles, the status of pedestrians, and the like in the parking lot 200, and inputs a control instruction to the monitoring device 31 if necessary.

An exiting position 40 is a location where a driver 400 exits from an autonomous driving vehicle 41. The driver 400 stops the autonomous driving vehicle 41 at the exiting position 40 and exits from the autonomous driving vehicle 41. When the driver 400 exits from the autonomous driving vehicle 41, the driving authority of the autonomous driving vehicle is handed over to the manager 300. In addition to exiting from the autonomous driving vehicle 41, the driver 400 can instruct handing over of the driving authority explicitly by using a touch panel of a car navigation system incorporated in the autonomous driving vehicle 41 or a mobile terminal possessed by the driver 400.

After the driving authority is handed over from the driver 400 to the manager 300, the autonomous driving vehicle 41 travels autonomously to the parking facility 20. The traveling status of the autonomous driving vehicle is detected by the facility sensor device 21 and the facility sensor device 21 transmits facility-sensor image data to the monitoring device 31. As described above, the manager 300 views the facility-sensor image data to monitor the traveling status of the autonomous driving vehicle 41. Due to the traveling of the autonomous driving vehicle 41, when there is a possibility of a danger such as collision with another vehicle, collision with a pedestrian, and the like, the manager 300 instructs stopping of traveling of the autonomous driving vehicle 41 to the monitoring device 31. Due to the instruction for stopping traveling from the manager 300, vehicle control information for instructing stopping of traveling is transmitted from the monitoring device 31 to the autonomous driving vehicle 41, and the autonomous driving vehicle 41 stops its driving.

While stopping of traveling of the autonomous driving vehicle 41 has been described here, in a case where the autonomous driving vehicle 41 stops as the parking lot 200 is congested and autonomous traveling has become difficult, it is possible to configure that the manager 300 confirms the safety around the autonomous driving vehicle 41 and transmits vehicle control information for instructing starting of traveling via the monitoring device 31.

Figure 2:
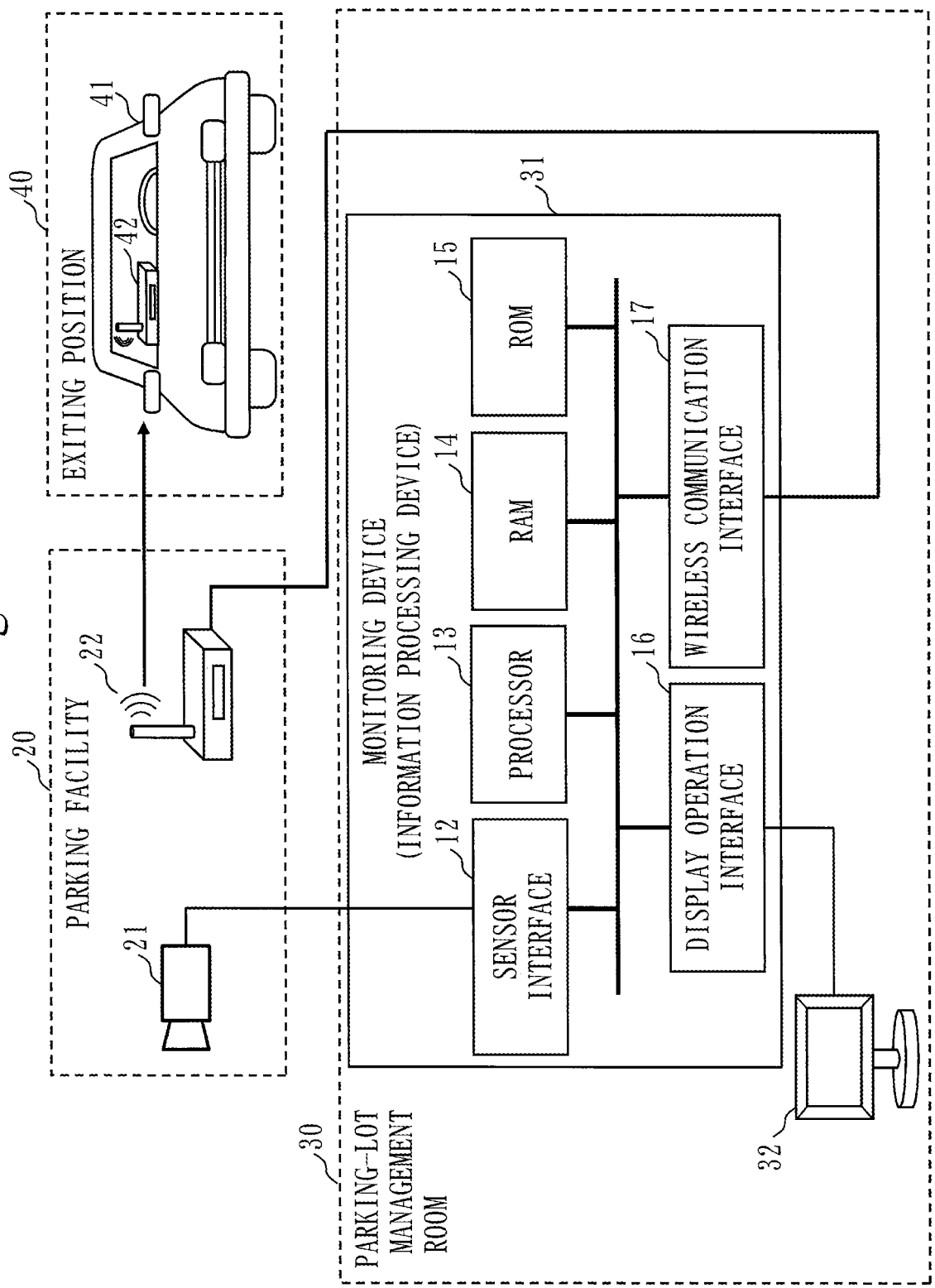
FIG. 2 is a diagram illustrating a hardware configuration example of the parking-lot management system according to the first embodiment.

FIG. 2 illustrates a hardware configuration example of the parking-lot management system.

In the parking facility 20, a pair of the facility sensor device 21 and a wireless communication device 22 is arranged. Although only one pair of the facility sensor device 21 and the wireless communication device 22 is illustrated in FIG. 2, it is assumed that a plurality of pairs of the facility sensor device 21 and the wireless communication device 22 are arranged in the parking facility 20.

The monitoring device 31 and a display operation device 32 are arranged in the parking-lot management room 30.

The monitoring device 31 is configured by a sensor interface 12, a processor 13, a RAM (Random Access Memory) 14, a ROM (Read Only Memory) 15, a display operation interface 16, and a wireless communication interface 17. The monitoring device 31 is a computer. The monitoring device 31 may be implemented by using a general personal computer. Further, the monitoring device 31 may be also implemented by an embedded device, an FPGA (Field-Programmable Gate Array) board, and the like.

The monitoring device 31 corresponds to an information processing device. Further, the operations performed by the monitoring device 31 correspond to an information processing method and an information processing program.

Each of the plurality of facility sensor devices 21 arranged in the parking facility 20 is connected to the monitoring device 31. The plurality of facility sensor devices 21 and the monitoring device 31 are connected to each other via the Internet, for example. Since the plurality of facility sensor devices 21 and the monitoring device 31 are connected to each other via the Internet, even when the monitoring device 31 is at a location away from the parking facility 20, the plurality of facility sensor devices 21 and the monitoring device 31 are communicable to each other.

Facility-sensor image data obtained by each of the facility sensor devices 21 is transmitted to the monitoring device 31.

In the monitoring device 31, the sensor interface 12 receives facility-sensor image data transmitted from each of the facility sensor devices 21. The received facility-sensor image data is temporarily stored in the RAM 14. Subsequently, the processor 13 calculates the priority of the facility-sensor image data. Facility-sensor image data with a high priority is preferentially displayed on the display operation device 32 that is connected to the monitoring device 31 via the display operation interface 16.

The display operation device 32 is, for example, a touch panel with a display.

An instruction to the autonomous driving vehicle 41 that has been input to the display operation device 32 by the manager 300 is received by the display operation interface 16. The processor 13 generates vehicle control information according to the instruction from the manager 300. The generated vehicle control information is transmitted from the wireless communication interface 17 to the wireless communication device 22 installed in the parking facility 20.

The wireless communication device 22 receives the vehicle control information transmitted from the monitoring device 31 and distributes the received vehicle control information.

The autonomous driving vehicle 41 has a wireless communication device 42 incorporated therein.

The wireless communication device 42 receives vehicle control information distributed from the wireless communication device 22.

Normally, the autonomous driving vehicle 41 travels with an automatic parking function. However, when the wireless communication device 42 receives the vehicle control information, the autonomous driving vehicle 41 prioritizes the instruction of the vehicle control information and stops or starts its traveling.

Figure 3:
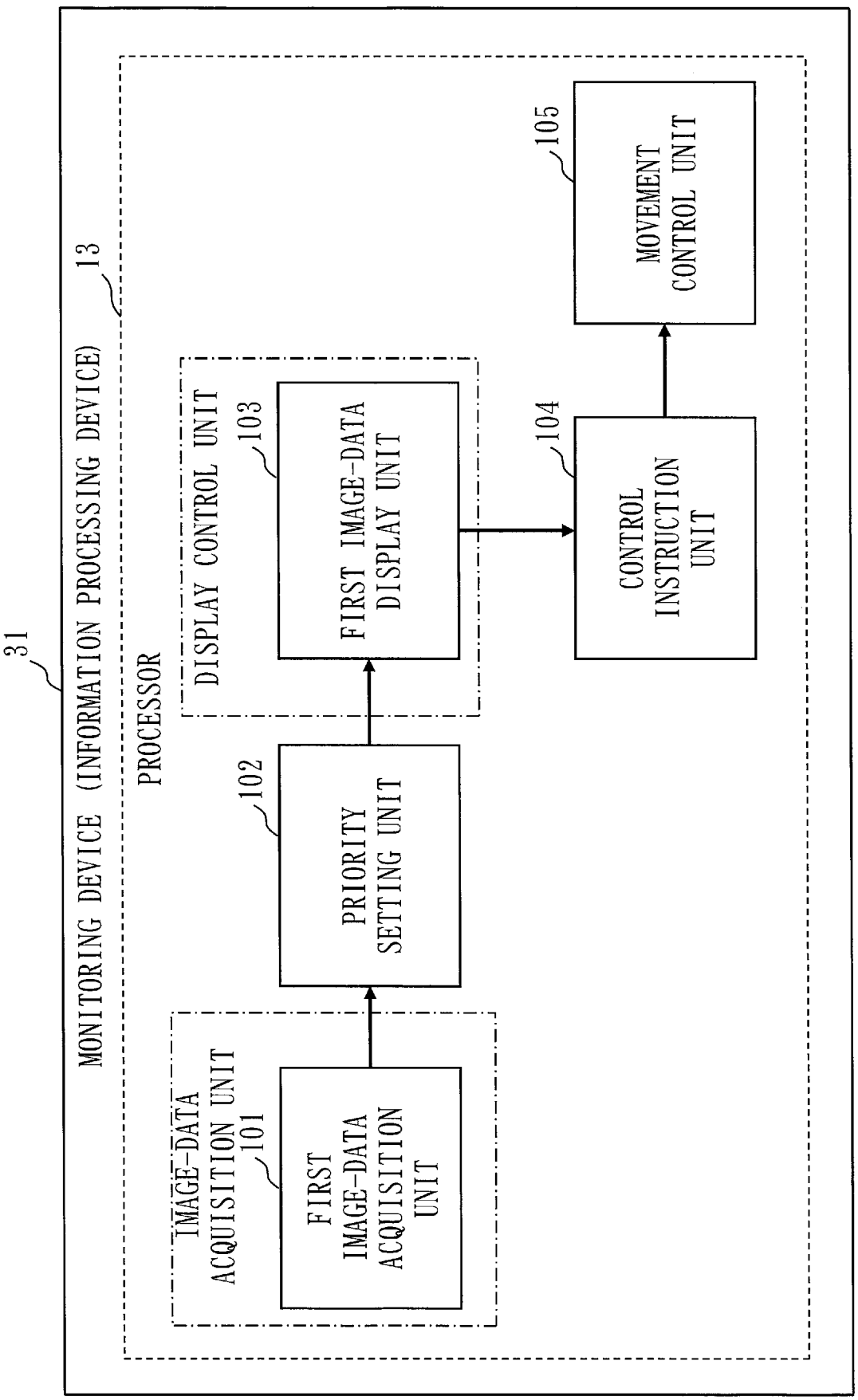
FIG. 3 is a diagram illustrating a functional configuration example of a monitoring device according to the first embodiment.

FIG. 3 illustrates a functional configuration example of the monitoring device 31.

The monitoring device 31 includes a first image-data acquisition unit 101, a priority setting unit 102, a first image-data display unit 103, a control instruction unit 104, and a movement control unit 105.

The first image-data acquisition unit 101, the priority setting unit 102, the first image-data display unit 103, the control instruction unit 104, and the movement control unit 105 are realized by a program. The program for realizing the first image-data acquisition unit 101, the priority setting unit 102, the first image-data display unit 103, the control instruction unit 104, and the movement control unit 105 is stored in the ROM 15. The program is loaded into the RAM 14 from the ROM 15. The program is then read from the processor 13 and executed by the processor 13.

FIG. 3 schematically illustrates a state where the processor 13 is executing a program for realizing the functions of the first image-data acquisition unit 101, the priority setting unit 102, the first image-data display unit 103, the control instruction unit 104, and the movement control unit 105.

The first image-data acquisition unit 101 acquires a plurality of pieces of facility-sensor image data transmitted from a plurality of wireless communication devices 22 via the sensor interface 12.

Figure 4:
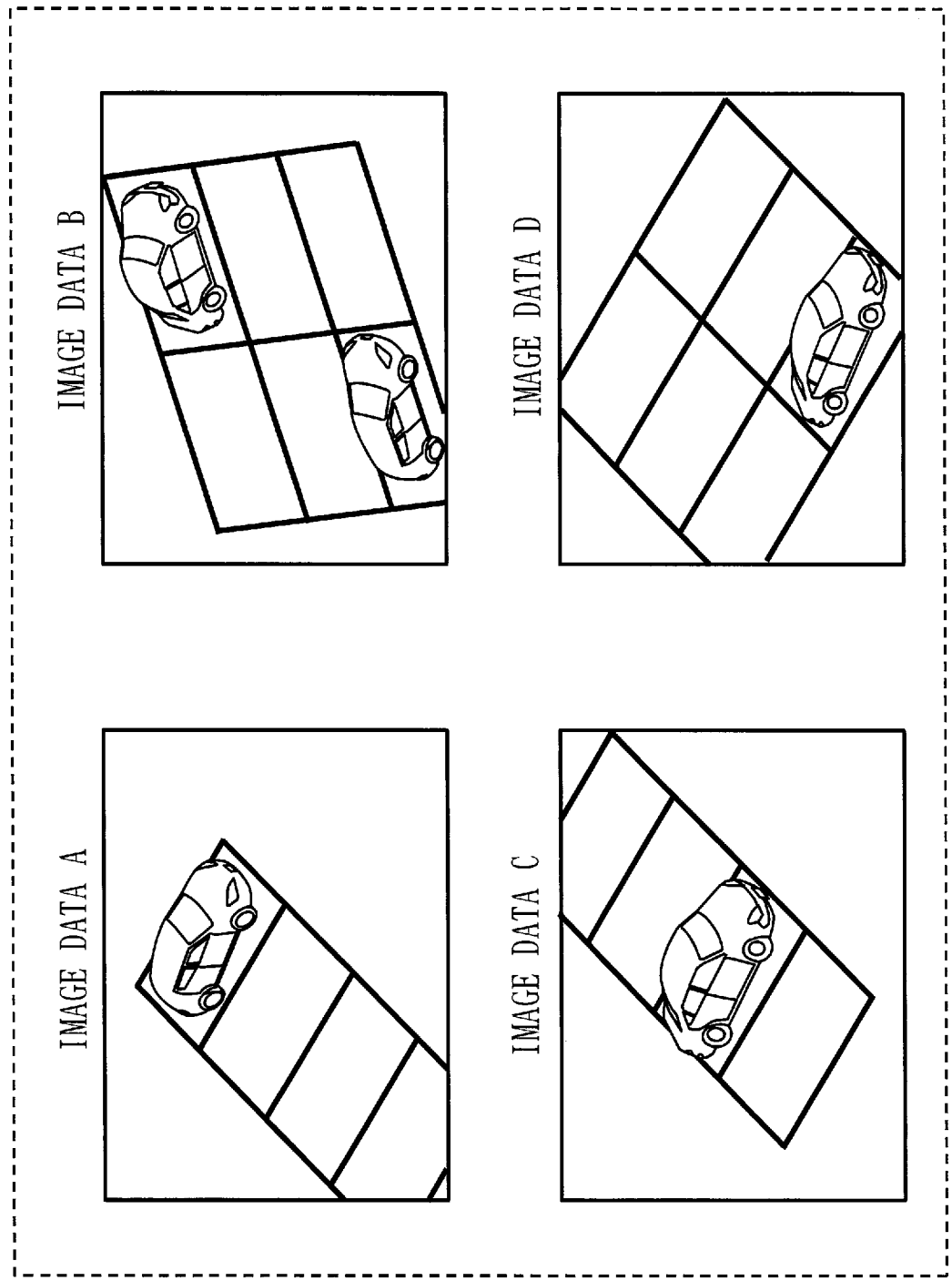
FIG. 4 is a diagram illustrating an example of facility-sensor image data according to the first embodiment.

FIG. 4 illustrates an example of facility-sensor image data when the facility sensor devices 21 are camera sensors.

Each of image data A, image data B, image data C, and image data D is facility-sensor image data captured by facility sensor devices 21 arranged at different positions. The image data A, the image data B, the image data C, and the image data D represent the statuses of different areas in the parking facility 20.

Further, as the facility sensor devices 21, infrared sensors or optical laser sensors can be used. Infrared sensors can measure temperature changes. Therefore, when infrared sensors are used as the facility sensor devices 21, the facility sensor devices 21 can detect pedestrians in the parking lot 200. Optical laser sensors calculate distance information based on a time since projected light is reflected on an object until it arrives. By projecting laser light to various angles, the optical laser sensors measure a three-dimensional shape of the parking facility 20.

In this manner, the first image-data acquisition unit 101 can acquire information such as the position and exterior of the autonomous driving vehicle 41 and the presence/absence of pedestrians in the parking lot 200, and the three-dimensional shape of the parking facility 20.

The first image-data acquisition unit 101 corresponds to an image-data acquisition unit. Further, the processes performed by the first image-data acquisition unit 101 correspond to an image-data acquiring process.

The priority setting unit 102 sets a priority to each of the plurality of pieces of facility-sensor image data acquired by the first image-data acquisition unit 101. The priority is a priority for displaying the facility-sensor image data to the manager 300.

Pieces of facility-sensor image data with a high priority are displayed in a high visibility display mode.

The priority setting unit 102 calculates the priority based on the degree of danger. The priority setting unit 102 analyzes the status shown in each of the pieces of facility-sensor image data, and estimates the degree of danger in the area shown in each of the pieces of facility-sensor image data. For example, the priority setting unit 102 estimates the degree of danger based on any of the distance and congestion among vehicles, the presence/absence of pedestrians, and the presence/absence of manual driving vehicles, or on any combination of these elements. The priority setting unit 102 then sets the priority of each of the pieces of facility-sensor image data based on the estimated degree of danger. The priority setting unit 102 sets a higher priority to pieces of facility-sensor image data with a higher degree of danger.

The processes performed by the priority setting unit 102 correspond to a priority setting process.

Figure 5:
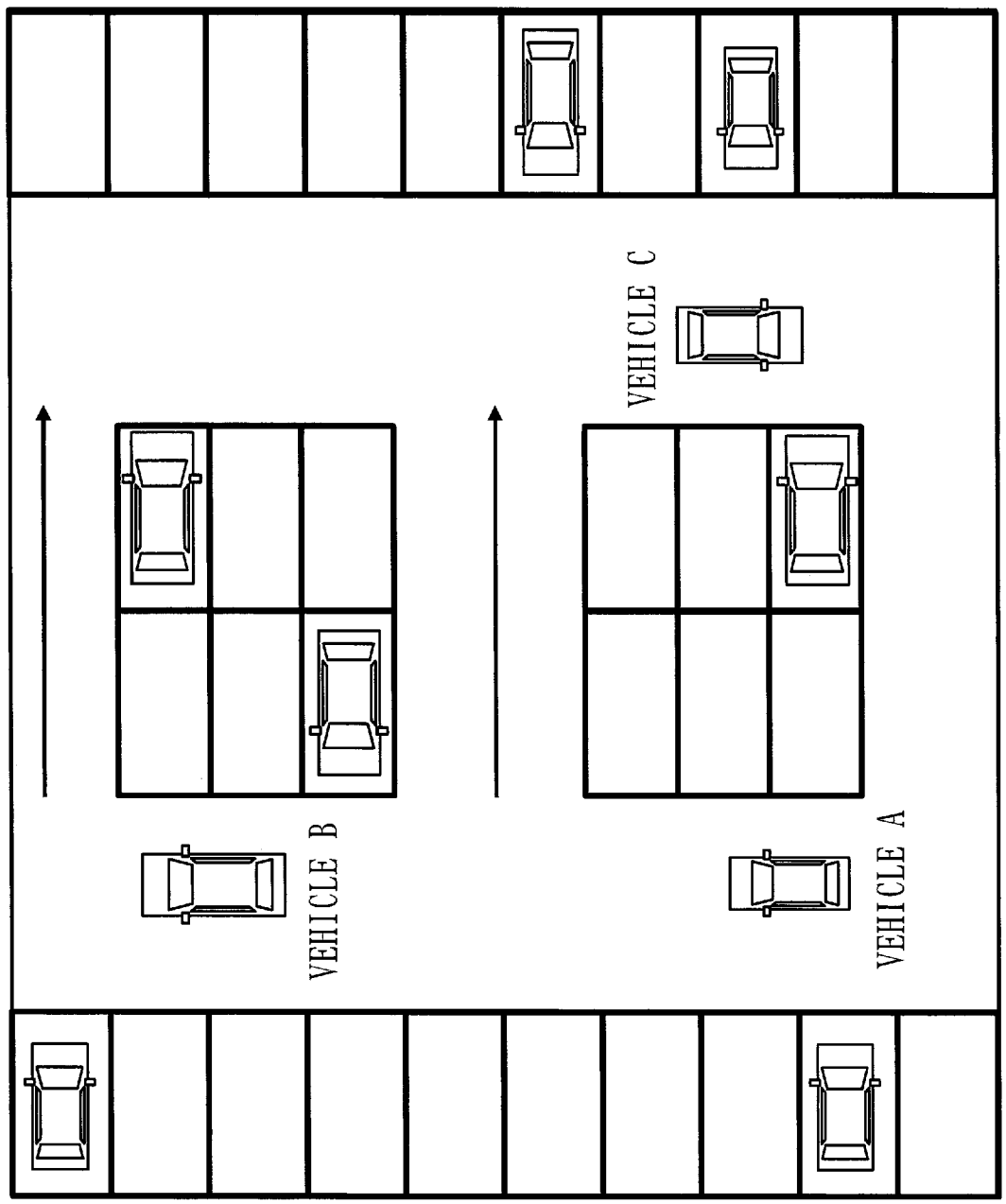
FIG. 5 is a diagram illustrating an example of a bird's-eye view of a parking lot according to the first embodiment.

FIG. 5 illustrates an example of a bird's-eye view of the parking lot 200. That is, FIG. 5 is image data obtained when the entirety of the parking lot 200 is captured from above. The vehicles within the frame lines in FIG. 5 (the white frames in the parking lot 200) are parked vehicles, and are in a stopped state. A vehicle A, a vehicle B, and a vehicle C located outside of the frame lines in FIG. 5 are vehicles conducting autonomous traveling for automatic parking, and are in a moving state.

The priority setting unit 102 sets the degree of danger of facility-sensor image data in which an autonomously traveling vehicle is shown to be higher than that of facility-sensor image data in which a stopped vehicle is shown.

Further, the priority setting unit 102 sets the degree of danger of the facility-sensor image data in which a vehicle having a short distance from another vehicle is shown to be higher.

The priority setting unit 102 uses positional information of vehicles acquired by the first image-data acquisition unit 101 to calculate a distance between vehicles. The priority setting unit 102 does not calculate a direct distance between vehicles, but calculates a moving distance (a passage) in a parking lot. While the direct distance between the vehicle A and the vehicle B and the direct distance between the vehicle A and the vehicle C are almost equal in FIG. 5, since frame borders (blank frames) (parking spaces) are present between the vehicle A and the vehicle C, the moving distance from the position of the vehicle A to the position of the vehicle C is longer than the moving distance from the position of the vehicle A to the position of the vehicle B. Therefore, the degree of danger of facility-sensor image data in which the vehicle A is shown and the degree of danger of facility-sensor image data in which the vehicle B is shown become higher than the degree of danger of facility-sensor image data in which the vehicle C is shown. The priority setting unit 102 analyzes a bird's-eye view generated by a bird's-eye view generation unit 106 described later to calculate a distance between vehicles.

The priority setting unit 102 sets the degree of danger higher as for facility-sensor image data with a higher congestion degree of vehicles.

The priority setting unit 102 analyzes a bird's-eye view to calculate a ratio of vehicles occupying a certain area in the parking lot 200, thereby determining the congestion degree of vehicles.

Further, the priority setting unit 102 sets the degree of danger higher as for facility-sensor image data in which pedestrians are shown. That is, the priority setting unit 102 analyzes the facility-sensor image data to detect pedestrians. Subsequently, the priority setting unit 102 sets the degree of danger higher as for facility-sensor image data in which a larger number of pedestrians are shown.

Further, the priority setting unit 102 sets the degree of danger of facility-sensor image data in which manual driving vehicles are shown to be higher than the degree of danger of facility-sensor image data in which manual driving vehicle is not shown.

The movement control unit 105 described later determines that uncontrollable vehicles are manual driving vehicles. The priority setting unit 102 determines whether any manual driving vehicle is shown in facility-sensor image data based on the license plate numbers of the vehicles shown in the facility-sensor image data.

Further, the priority setting unit 102 sets the degree of danger of facility-sensor image data in which any autonomous driving vehicle that stops its traveling on a street is shown to be higher than the degree of danger of facility-sensor image data in which any autonomous driving vehicle that stops its traveling is not shown.

Autonomous driving vehicles stop their traveling in consideration of safety when another vehicle is present around these vehicles. Therefore, the priority setting unit 102 sets the degree of danger of facility-sensor image data in which any automatic driving vehicle that stops its traveling on a street is shown to be higher.

Further, it is possible that the priority setting unit 102 causes autonomous driving vehicles to calculate the degree of difficulty when conducting autonomous traveling. In addition, it is also possible that the priority setting unit 102 acquires difficulty degree information via the first image-data acquisition unit 101 and sets the degree of danger of facility-sensor image data in which vehicles with a high degree of difficulty are shown to be higher.

With the above procedures, the priority setting unit 102 calculates a priority with regard to each of the facility-sensor image data obtained by a plurality of facility sensor devices 21.

The first image-data display unit 103 decides a display mode at the time of displaying a plurality of pieces of facility-sensor image data according to the priority set by the priority setting unit 102. Subsequently, the first image-data display unit 103 displays the plurality of pieces of facility-sensor image data in the decided display mode on the display operation device 32 via the display operation interface 16.

The first image-data display unit 103 corresponds to a display control unit. Further, the processes performed by the first image-data display unit 103 correspond to a display control process.

Figure 6:
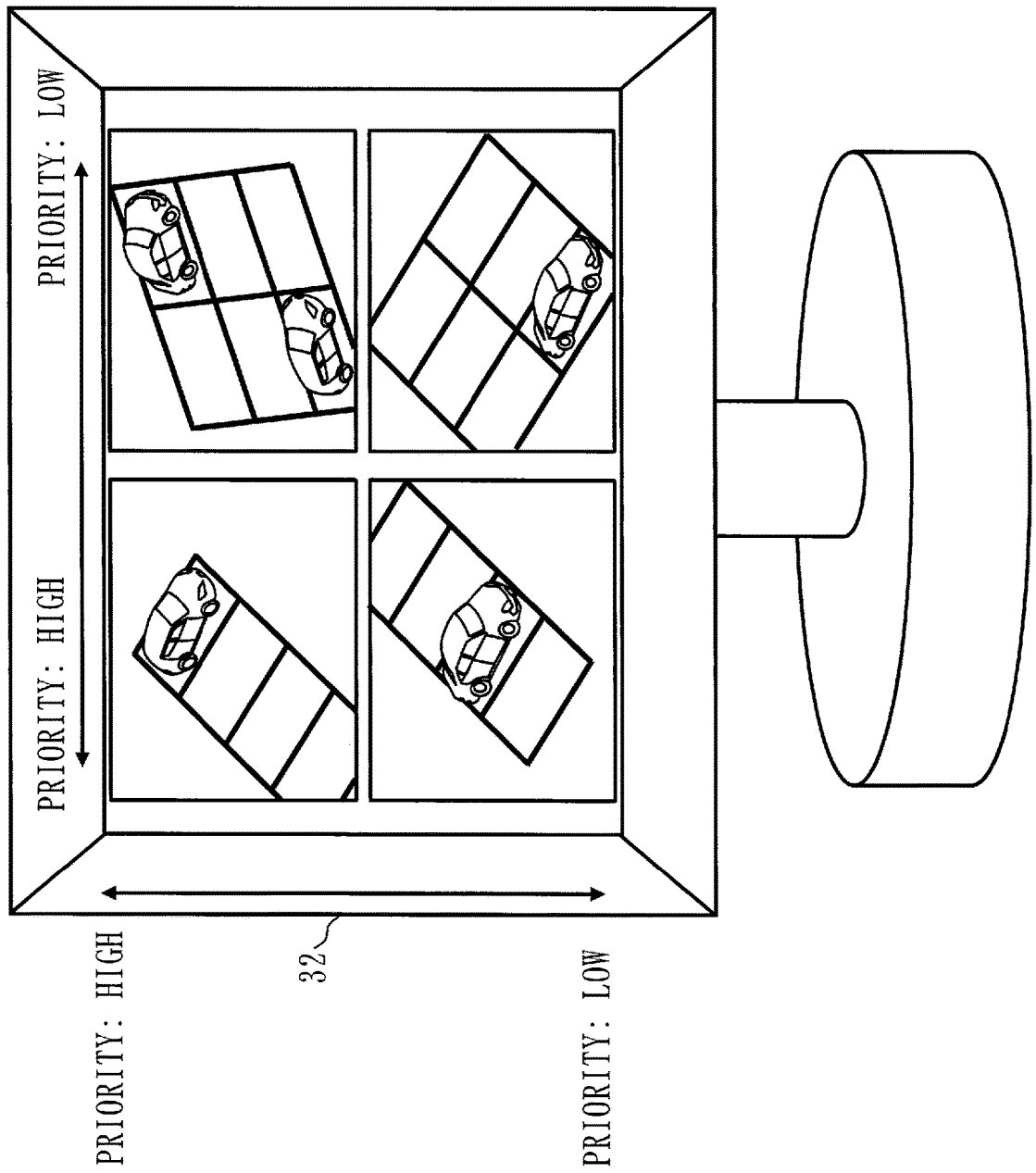
FIG. 6 is a diagram illustrating a display example of the facility-sensor image data according to the first embodiment.

FIG. 6 illustrates a display example of facility-sensor image data.

FIG. 6 illustrates an example in which pieces of facility-sensor image data are displayed on the display operation device 32 in order of priority. In the example of FIG. 6, facility-sensor image data with the highest priority is displayed in the upper left area on the screen. Facility-sensor image data with the second highest priority is displayed in the upper right area on the screen. Facility-sensor image data with the third highest priority is displayed in the lower left area on the screen. Facility-sensor image data with the lowest priority is displayed in the lower right area on the screen.

Further, when the monitoring device 31 receives n pieces of facility-sensor image data obtained by n (n≤3) facility sensor devices 21, it is possible that the first image-data display unit 103 selects m (2≤m<n) pieces of facility-sensor image data based on the priority to display only m pieces of facility-sensor image data on the display operation device 32.

In FIG. 6, while four pieces of facility-sensor image data are displayed in the same size, the display sizes of the pieces of facility-sensor image data may be changed according to the priority.

Figure 7:
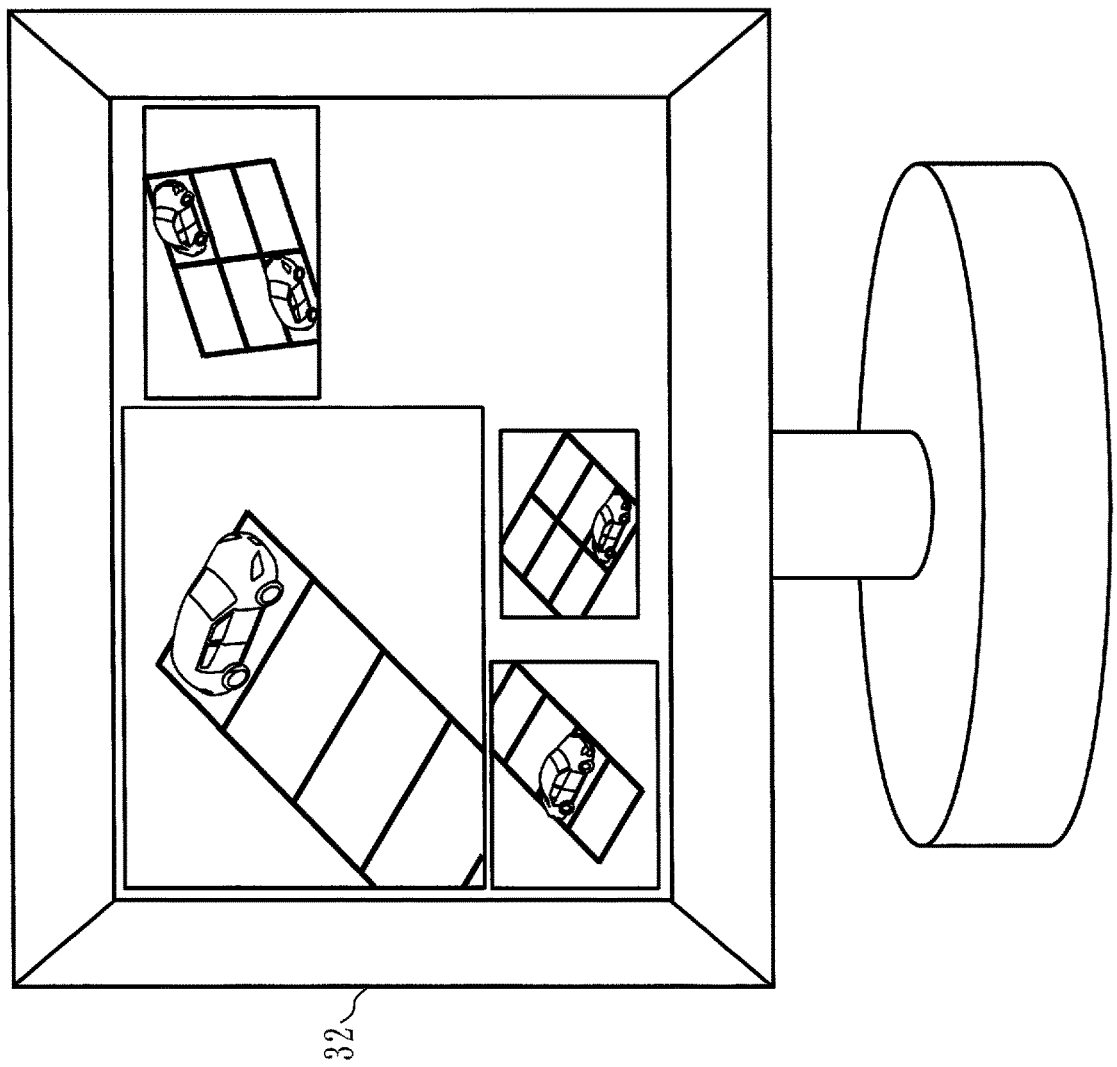
FIG. 7 is a diagram illustrating a display example of the facility-sensor image data according to the first embodiment.

FIG. 7 illustrates an example in which the display sizes of pieces of facility-sensor image data are changed according to the priority.

In the example of FIG. 7, facility-sensor image data with a higher priority has a larger display size.

Further, the first image-data display unit 103 may display a bird's-eye view of the parking lot 200 exemplified in FIG. 5. When the first image-data display unit 103 displays a bird's-eye view of the parking lot 200, as illustrated in FIG. 8, the bird's-eye view generation unit 106 is added to the functional configuration example in FIG. 3.

The bird's-eye view generation unit 106 generates a bird's-eye view based on a plurality of pieces of facility-sensor image data obtained by a plurality of facility sensor devices 21.

Similarly to the first image-data acquisition unit 101, the priority setting unit 102, the first image-data display unit 103, the control instruction unit 104, and the movement control unit 105, the bird's-eye view generation unit 106 is also realized by a program.

Figure 8:
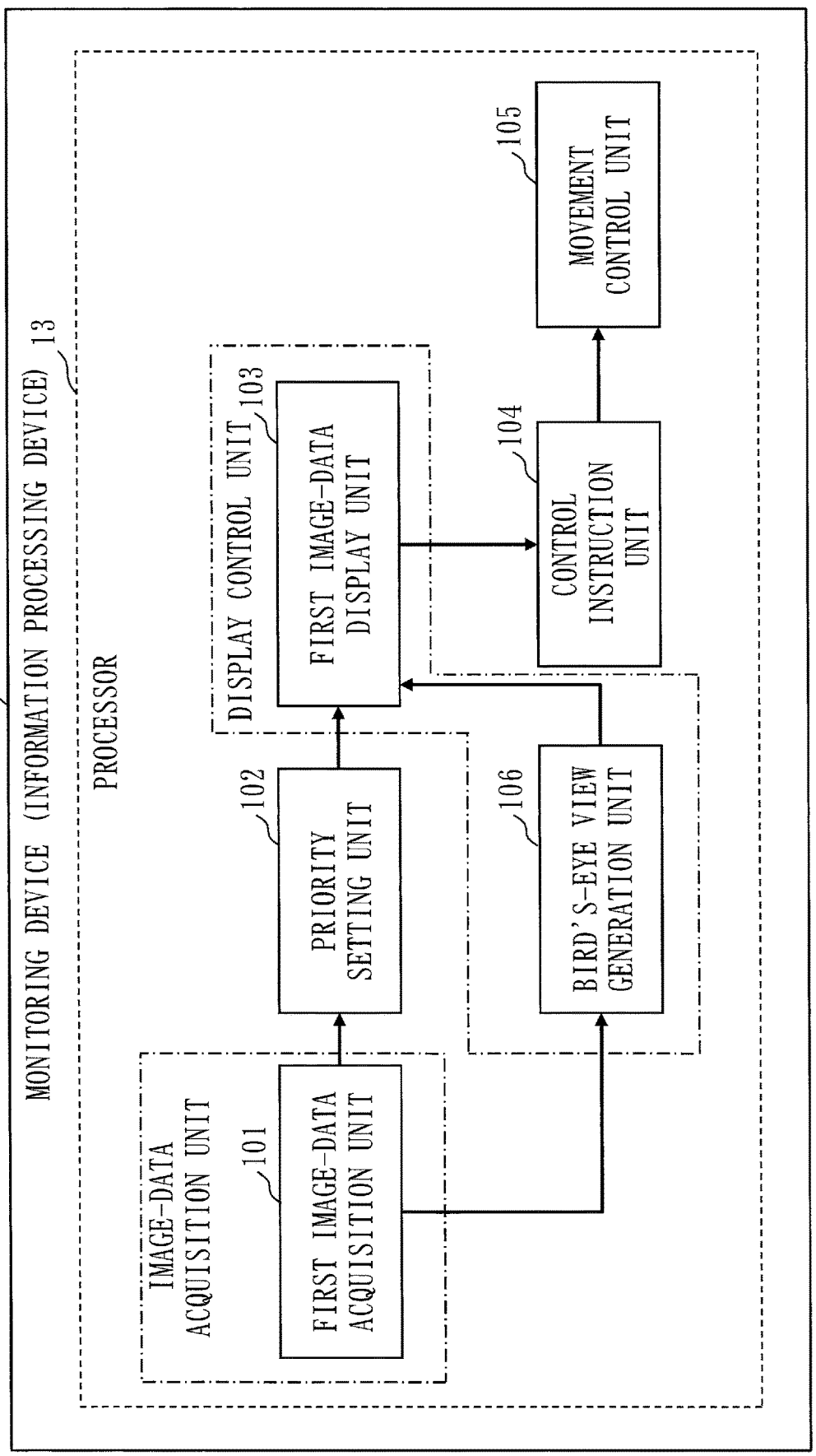
FIG. 8 is a diagram illustrating another functional configuration example of the monitoring device according to the first embodiment.

In the functional configuration illustrated in FIG. 8, the first image-data display unit 103 and the bird's-eye view generation unit 106 correspond to a display control unit.

Figure 9:
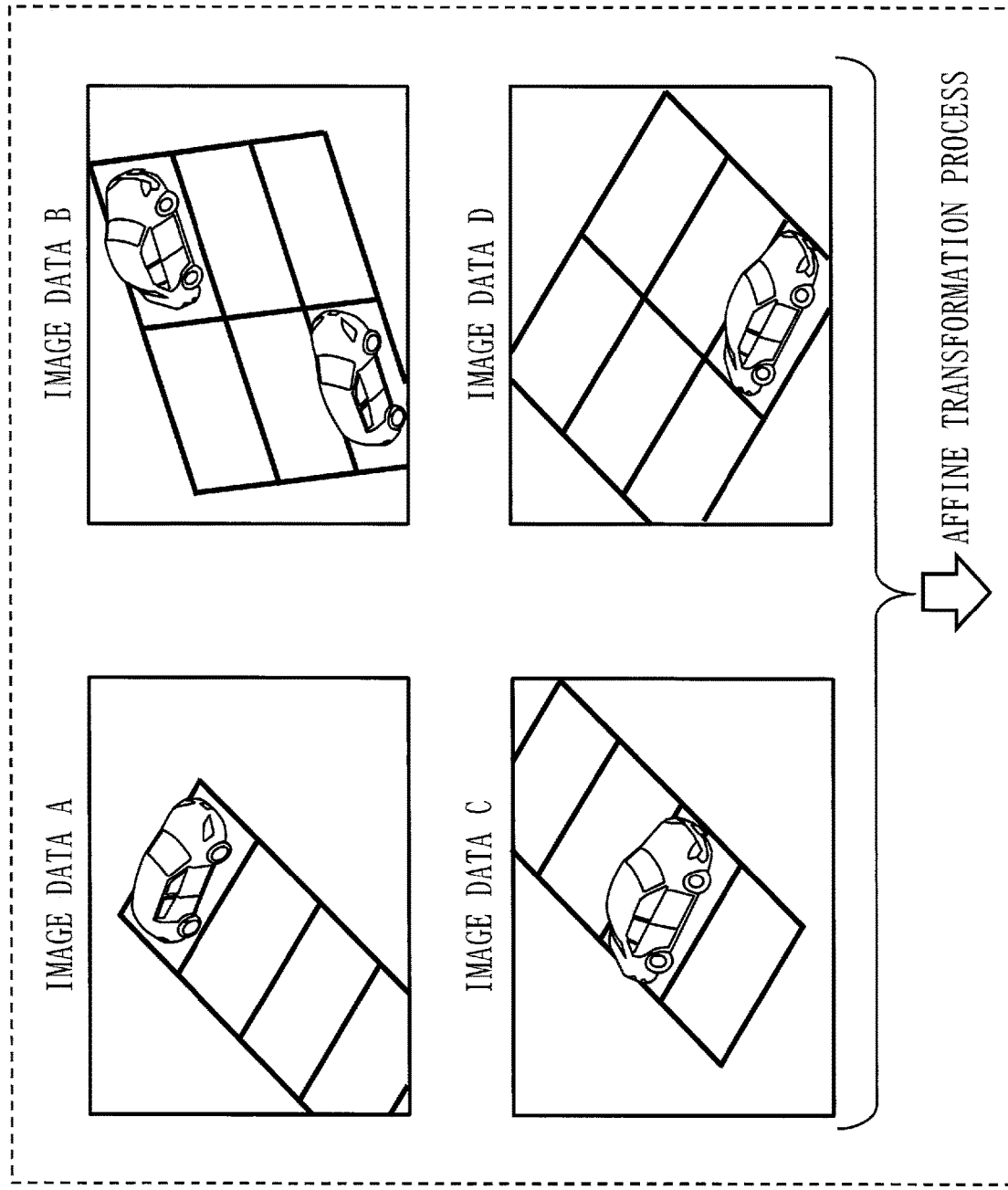
FIG. 9 is a diagram illustrating a generation procedure of a bird's-eye view of the parking lot according to the first embodiment.
Figure 10:
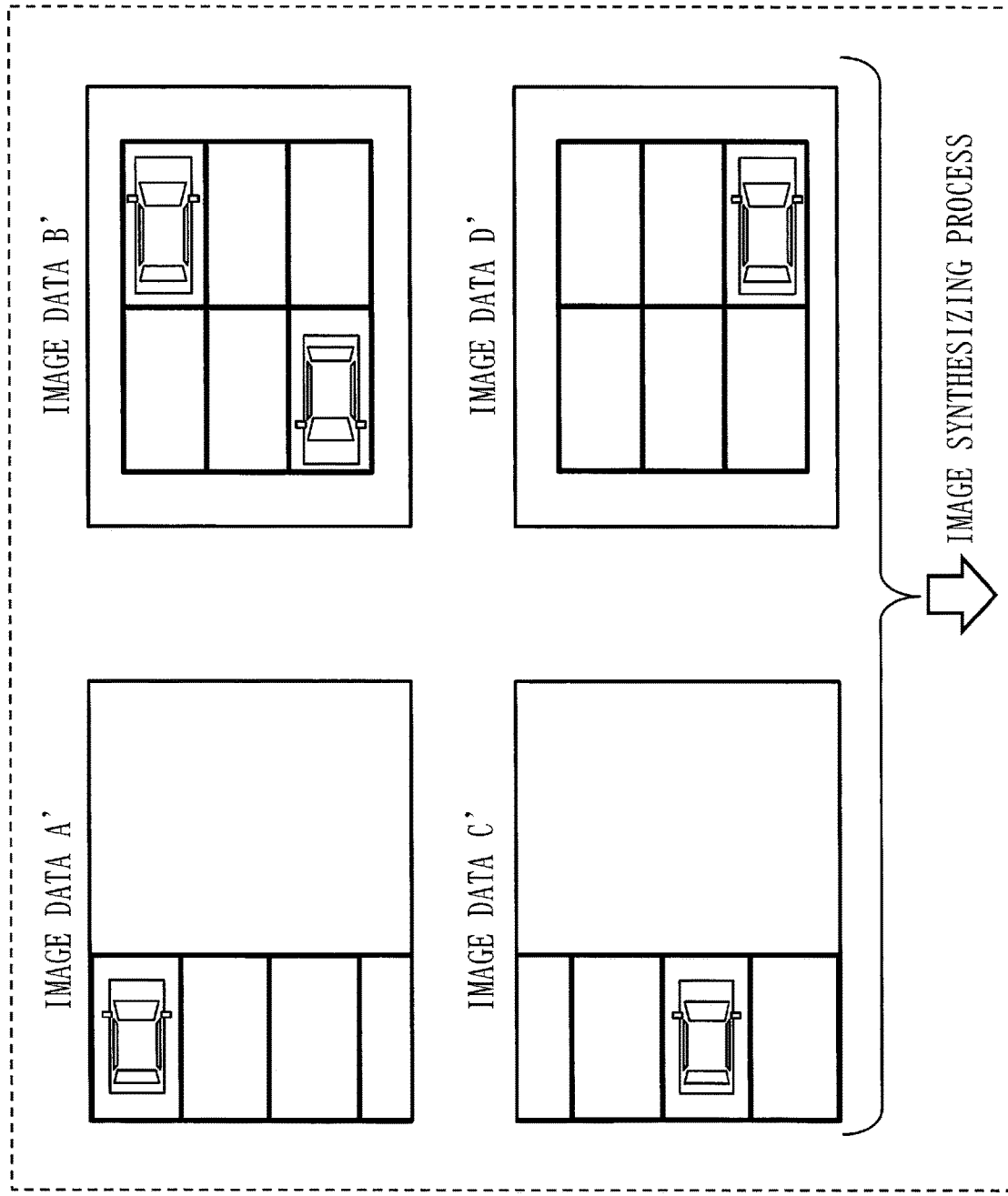
FIG. 10 is a diagram illustrating a generation procedure of the bird's-eye view of the parking lot according to the first embodiment.
Figure 11:
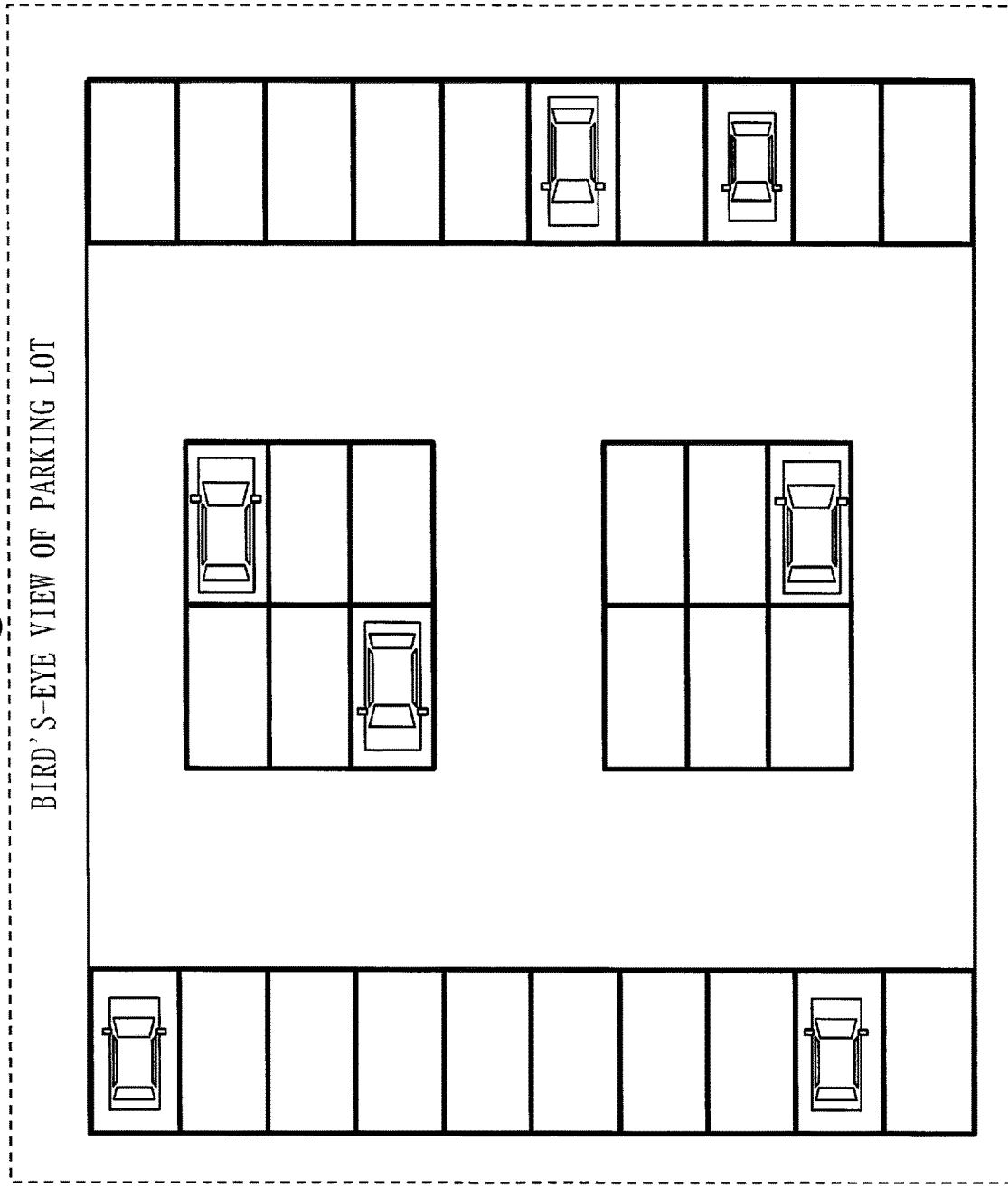
FIG. 11 is a diagram illustrating a generation procedure of the bird's-eye view of the parking lot according to the first embodiment.

Generation procedures of a bird's-eye view by the bird's-eye view generation unit 106 are illustrated in FIGS. 9, 10, and 11.

Image data A, image data B, image data C, and image data D in FIG. 9 are the same as the image data A, the image data B, the image data C, and the image data D illustrated in FIG. 4, respectively. When the installation position and the installation direction of the camera sensor are known, the bird's-eye view generation unit 106 performs affine transformation on facility-sensor image data (enlargement, reduction, rotation, and parallel shift of image data). Specifically, by affine transformation, as illustrated in FIG. 10, the bird's-eye view generation unit 106 can transform the image data A, the image data B, the image data C, and the image data D into image data A', image data B', image data C', and image data D', which are image data as the parking lot 200 is viewed from above. Further, when the installation direction of the camera sensor is not known, the bird's-eye view generation unit 106 may refer to the shape of the frame lines (the white frames) in the parking lot 200 to perform image transformation. Further, when the installation position of the camera sensor is not known, the bird's-eye view generation unit 106 may recognize number information and the like painted on the road surface of the parking lot 200 from the facility-sensor image data to estimate the installation position of the camera sensor.

Next, as illustrated in FIG. 11, the bird's-eye view generation unit 106 synthesizes the image data A', the image data B', the image data C', and the image data D' obtained by affine transformation to generate a bird's-eye view of the entire parking lot 200.

The bird's-eye view generation unit 106 synthesizes pieces of facility-sensor image data while causing parts of the pieces of facility-sensor image data of adjacent camera sensors to overlap on one another. Accordingly, the bird's-eye view generation unit 106 may adjust the zooming function of the camera sensors. More specifically, the bird's-eye view generation unit 106 adjusts the zooming function of the camera sensors to enlarge or reduce the capturing area of the camera sensors, thereby controlling to cause parts of the pieces of facility-sensor image data to overlap on one another.

With the processes described above, the bird's-eye view generation unit 106 can synthesize a plurality of pieces of facility-sensor image data of a plurality of camera sensors to generate a bird's-eye view of the entire parking lot 200.

Subsequently, the first image-data display unit 103 can present the bird's-eye view to the manager 300.

Figure 12:
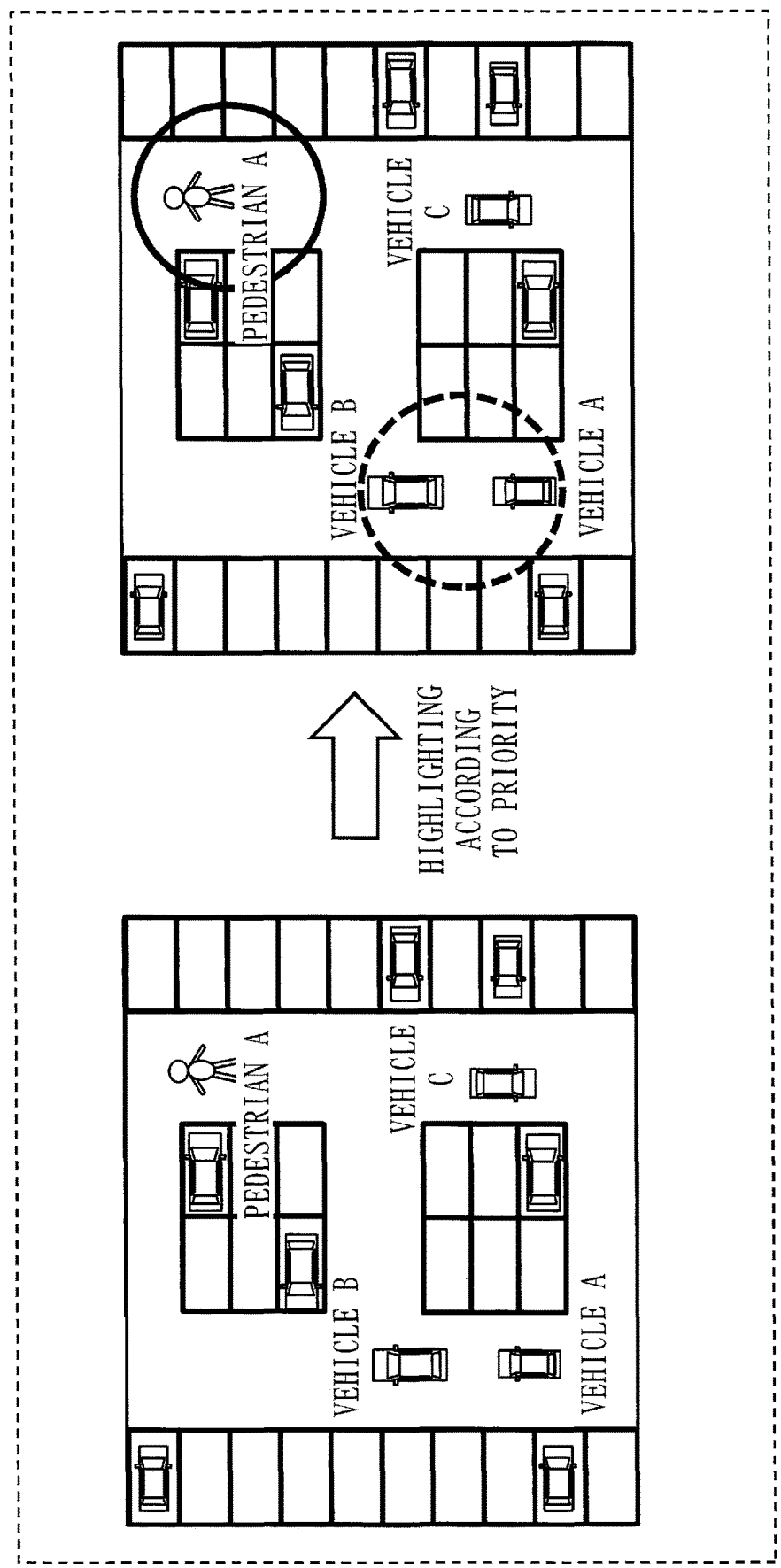
FIG. 12 is a diagram illustrating an example of a bird's-eye view of the parking lot including highlighting according to the first embodiment.

Further, as illustrated in FIG. 12, the first image-data display unit 103 may highlight a portion of a bird's-eye view in which facility-sensor image data to which the priority set by the priority setting unit 102 matches a predetermined condition is reflected.

That is, the first image-data display unit 103 may highlight a portion on which facility-sensor image data to which a priority equal to or greater than a threshold is set is reflected. In FIG. 12, since the priority of facility-sensor image data in which a pedestrian is shown is equal to or greater than a threshold, a portion in which a pedestrian is shown in the bird's-eye view is surrounded in a circle to be highlighted. Similarly, in FIG. 12, since the distance between the vehicle A and the vehicle B is short, the priority of the facility-sensor image data in which the vehicle A is shown and the priority of the facility-sensor image data in which the vehicle B is shown are equal to or greater than a threshold, and thus the portion in which the vehicle A and the vehicle B are shown in the bird's-eye view is surrounded in a circle to be highlighted.

As illustrated in FIG. 12, as the first image-data display unit 103 highlights a portion with a high priority, the manager 300 can easily recognize a danger.

The control instruction unit 104 generates a command based on an instruction to the autonomous driving vehicle 41 that is input to, for example, the display operation device 32 by the manager 300. Subsequently, the control instruction unit 104 outputs the generated command to the movement control unit 105.

The command generated by the control instruction unit 104 is any of a complete stop command for instructing stopping of all the autonomous driving vehicles 41, a stop command for instructing stopping of a certain autonomous driving vehicle 41, and a move command for instructing movement of a certain autonomous driving vehicle 41.

Figure 13:
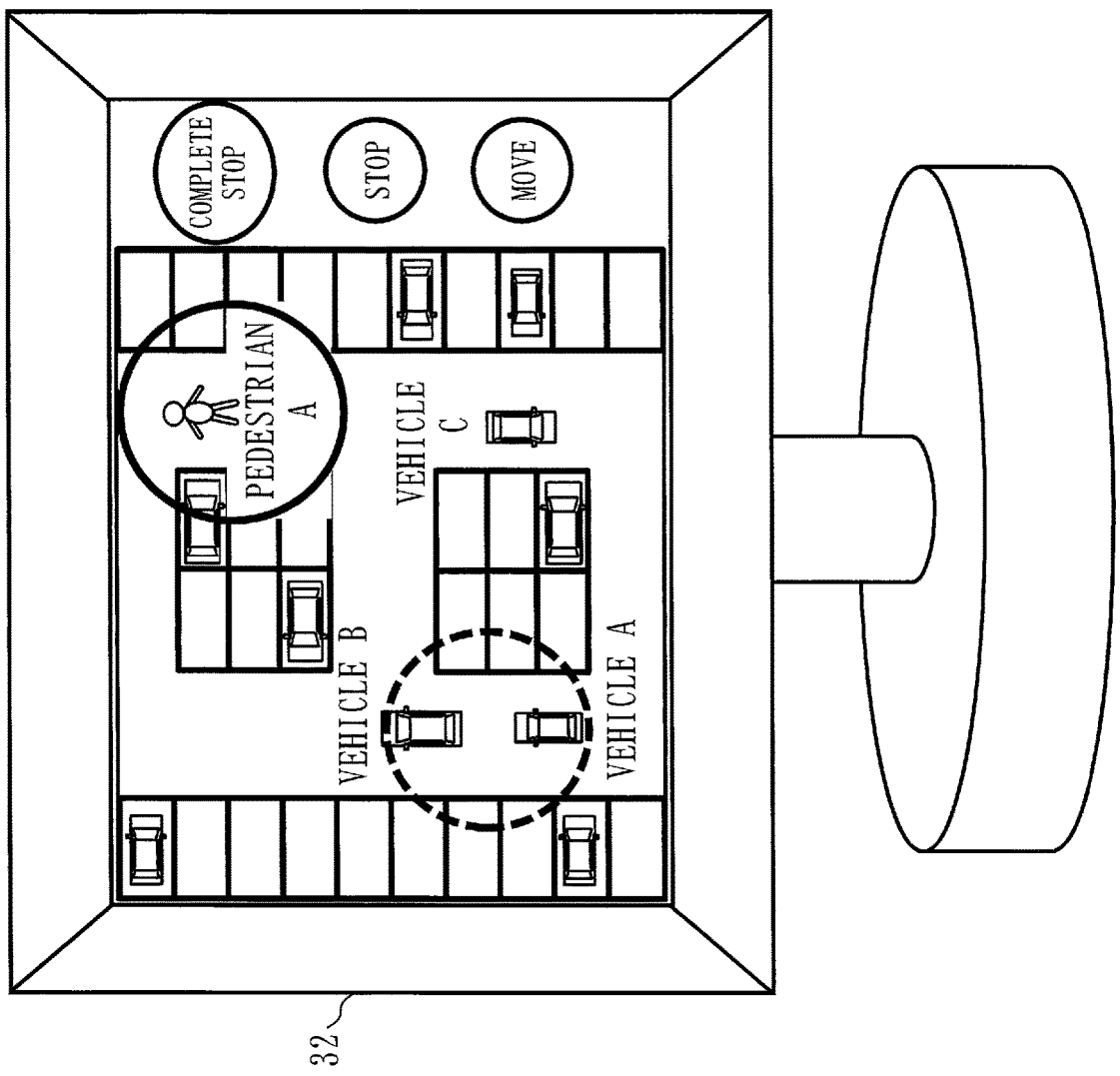
FIG. 13 is a diagram illustrating a display example of a display operation device according to the first embodiment.

In the present embodiment, for example, the display operation device 32 illustrated in FIG. 13 is used. The display operation device 32 in FIG. 13 is a touch panel with a display.

A bird's-eye view of the entire parking lot 200 generated by the bird's-eye view generation unit 106 is displayed on the display screen of the display operation device 32 in FIG. 13. A complete stop button, a stop button, and a move button are displayed on the right side of the display screen. The complete stop button, the stop button, and the move button are displayed by the first image-data display unit 103.

When the manager 300 is to stop the traveling of all the autonomous driving vehicles 41 traveling in the parking lot 200, the manager 300 touches the complete stop button on the display screen. With the touch on the complete stop button, the control instruction unit 104 is notified of an instruction for stopping the traveling of all the autonomous driving vehicles 41 traveling in the parking lot 200. As a result, the manager 300 can stop the traveling of all the autonomous driving vehicles 41.

When the manager 300 is to stop the traveling of a certain autonomous driving vehicle 41, the manager 300 first touches the stop button on the display screen. Next, the manager 300 touches the autonomous driving vehicle 41 to be stopped on the bird's-eye view. With these operations, the control instruction unit 104 is notified of an instruction for stopping the certain autonomous driving vehicle 41. As a result, the manager can stop the traveling of the certain autonomous driving vehicle 41.

Further, when the manager 300 is to move a certain autonomous driving vehicle 41 to a certain location, the manager 300 first touches the move button on the display screen. Next, the manager 300 touches the autonomous driving vehicle 41 to be moved on the bird's-eye view, and moves the autonomous driving vehicle 41 to an arbitrary movement destination while keeping the touch on the autonomous driving vehicle 41. The finger movement locus is the traveling route of the autonomous driving vehicle 41. With these operations, the control instruction unit 104 is notified of an instruction for moving the certain autonomous driving vehicle 41 to the certain location. As a result, the manager 300 can move the certain autonomous driving vehicle 41 to the certain location.

Since the instruction accuracy of the instruction of a traveling route using a finger is low, when the finger deviates from the traveling road surface in the parking lot 200 on the touch panel, the control instruction unit 104 corrects the traveling route so that the traveling route stays within the traveling road surface.

Figure 14:
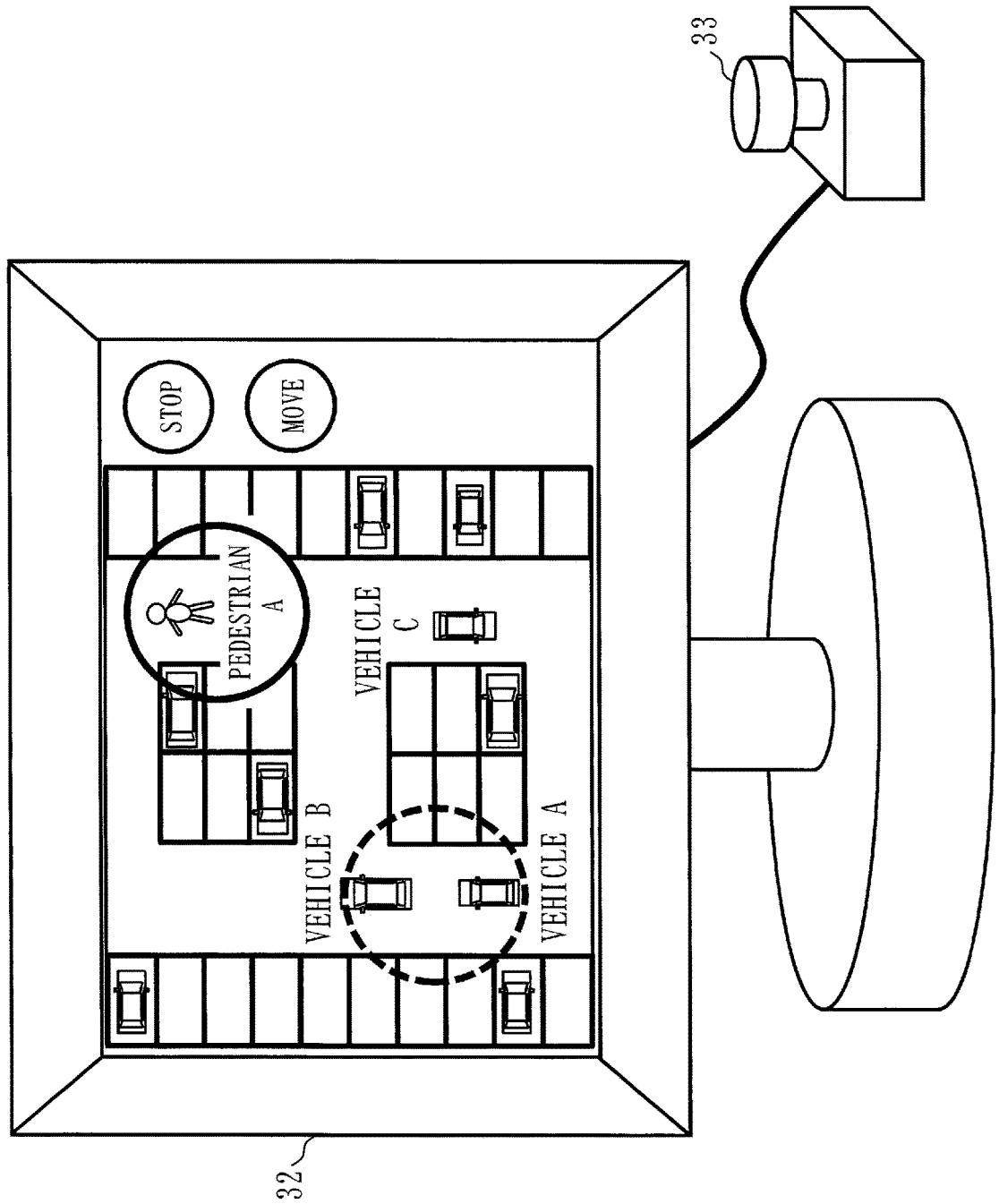
FIG. 14 is a diagram illustrating an example of a complete stop button according to the first embodiment.

Further, as illustrated in FIG. 14, a complete stop button 33 may be connected to the display operation device 32. When the manager 300 presses the complete stop button 33, the control instruction unit 104 is notified of an instruction for stopping the traveling of all the autonomous driving vehicles 41 that are traveling in the parking lot 200. As a result, the manager 300 can stop the traveling of all the autonomous driving vehicles 41.

Also when the complete stop button 33 is connected to the display operation device 32 as illustrated in FIG. 14, stopping of a certain autonomous driving vehicle 41 and movement of a certain autonomous driving vehicle 41 are performed by using the stop button and the move button illustrated in FIG. 13.

When the instruction from the manager 300 is a stop instruction for stopping a certain autonomous driving vehicle 41, the control instruction unit 104 acquires geographical coordinates of the current position of the autonomous driving vehicle 41 from the display operation device 32 via the display operation interface 16. Next, the control instruction unit 104 specifies a wireless communication device 22 that is arranged in the vicinity of the geographical coordinates of the current position of the autonomous driving vehicle 41 acquired from the display operation device 32. Subsequently, the control instruction unit 104 outputs an identifier of the specified wireless communication device 22 and a stop command to the movement control unit 105. Wireless-communication-device coordinate information indicating identifiers of respective wireless communication devices 22 and geographical coordinates of arrangement positions of the respective wireless communication devices 22 is stored in the ROM 15. The control instruction unit 104 uses the wireless-communication-device coordinate information to specify the wireless communication device 22 that is arranged in the vicinity of the current position of the autonomous driving vehicle 41.

Further, when the instruction from the manager 300 is an instruction for moving a certain autonomous driving vehicle 41, the control instruction unit 104 acquires, via the display operation interface 16, geographical coordinates of the current position of the autonomous driving vehicle 41, geographical coordinates of the movement destination of the autonomous driving vehicle 41, and geographical coordinates of one or more middle points between the current position and the movement destination of the autonomous driving vehicle 41 from the display operation device 32. Next, the control instruction unit 104 specifies the wireless communication device 22 that is arranged in the vicinity of the geographical coordinates of the current position of the autonomous driving vehicle 41 acquired from the display operation device 32. Subsequently, the control instruction unit 104 outputs the identifier of the specified wireless communication device 22, the geographical coordinates of the movement destination, the geographical coordinates of the middle point, and a move command to the movement control unit 105.

Further, when the instruction from the manager 300 is an instruction for stopping all the autonomous driving vehicles 41, the control instruction unit 104 extracts identifiers of all the wireless communication devices 22 arranged in the parking lot 200. The control instruction unit 104 then outputs the identifiers of all the wireless communication devices 22 and a complete stop command to the movement control unit 105.

The movement control unit 105 transmits vehicle control information including a command output from the control instruction unit 104 to the autonomous driving vehicle 41.

Specifically, when a stop command and an identifier of the wireless communication device 22 are output from the control instruction unit 104, the movement control unit 105 transmits vehicle control information including the stop command to a wireless communication device 22 that corresponds to the identifier output from the control instruction unit 104.

Further, when a move command, an identifier of the wireless communication device 22, geographical coordinates of a movement destination, and geographical coordinates of a middle point are output from the control instruction unit 104, the movement control unit 105 transmits vehicle control information including the move command, the geographical coordinates of the movement destination, and the geographical coordinates of the middle point to a wireless communication device 22 that corresponds to the identifier output from the control instruction unit 104.

Further, when a complete stop command and identifiers of all the wireless communication devices 22 are output, the movement control unit 105 transmits vehicle control information including the complete stop command to all the wireless communication devices 22.

The wireless communication device 22 having received the vehicle control information distributes the vehicle control information to the area in the vicinity.

Since the wireless communication device 42 of the autonomous driving vehicle 41 at the transmission destination of the vehicle control information is present in the vicinity of the wireless communication device 22 which distributes the vehicle control information, it can receive the vehicle control information.

\*\*\*Descriptions of Operations\*\*\*

Next, operation examples of the monitoring device 31 according to the present embodiment are described.

Figure 15:
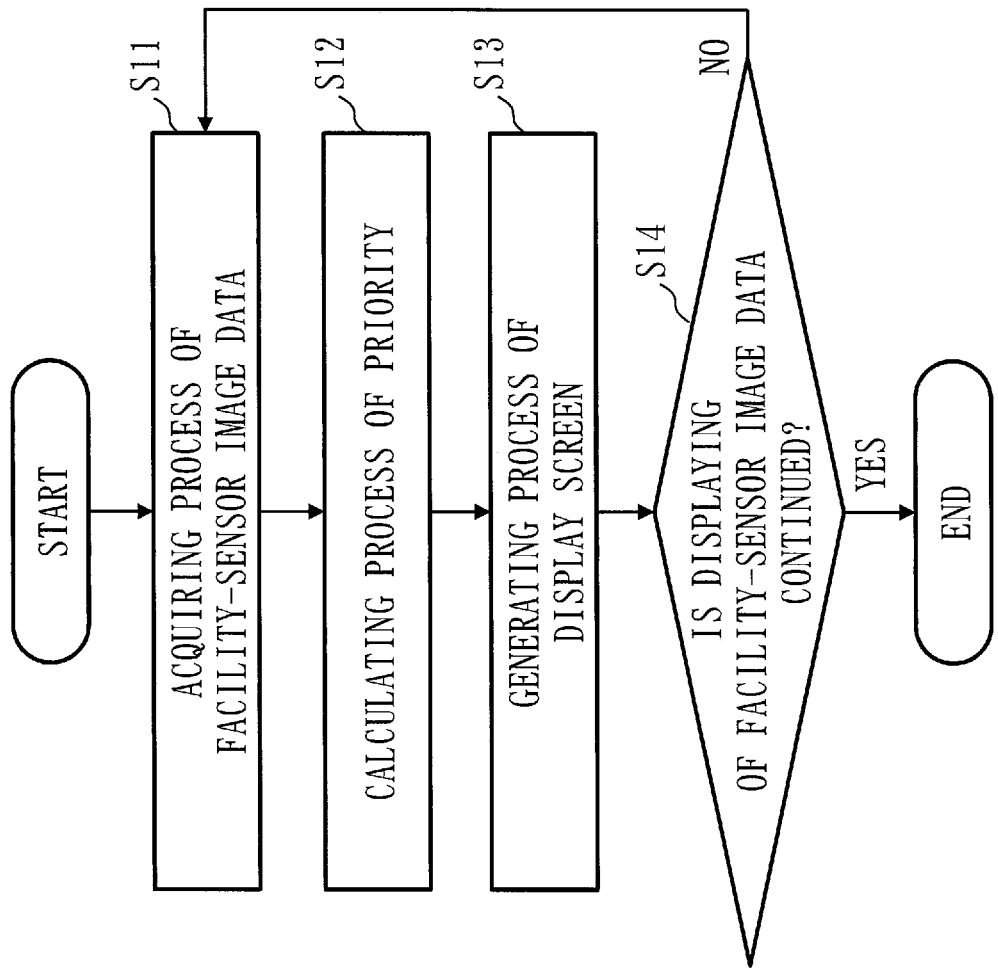
FIG. 15 is a flowchart illustrating an operation example of the monitoring device according to the first embodiment.

FIG. 15 is a flowchart illustrating procedures of the monitoring device 31 from acquiring facility-sensor image data to displaying the facility-sensor image data.

In Step S11, the first image-data acquisition unit 101 acquires facility-sensor image data obtained by the facility sensor device 21.

Next, in Step S12, the priority setting unit 102 calculates the priority of the facility-sensor image data acquired in Step S11. As described above, the priority setting unit 102 calculates a degree of danger based on the congestion of vehicles, the presence/absence of pedestrians, the presence/absence of autonomous driving vehicles 41 stopping their traveling, and the like, and sets the priority based on the calculated degree of danger.

Next, in Step S13, the first image-data display unit 103 decides a display mode at the time of displaying facility-sensor image data on the display operation device 32 according to the priority set in Step S12, and generates a display screen in the decided display mode. The first image-data display unit 103 then outputs the generated display screen to the display operation device 32 via the display operation interface 16.

That is, when the facility-sensor image data is displayed as illustrated in FIG. 6, the first image-data display unit 103 decides the display mode according to the priority, such as displaying facility-sensor image data A with the highest priority in the upper left area and displaying facility-sensor image data B with the second highest priority in the upper right area.

Further, when the facility-sensor image data is displayed as illustrated in FIG. 7, the first image-data display unit 103 decides the display mode according to the priority, such as displaying the image data A with the highest priority in the largest size and displaying the image data B with the second highest priority in a size smaller than that of the image data A on the right side of the image data A.

In Step S14, the first image-data display unit 103 determines whether displaying of the facility-sensor image data is continued. When the displaying of the facility-sensor image data is continued, the processes in Steps S11 to S13 are performed repeatedly.

With the above processes, the monitoring device 31 sets the priority to each of a plurality of pieces of facility-sensor image data obtained by a plurality of facility sensor devices 21 installed in the parking facility 20, and displays the plurality of pieces of facility-sensor image data according to the set priority in a display mode with better visibility for the manager 300.

Figure 16:
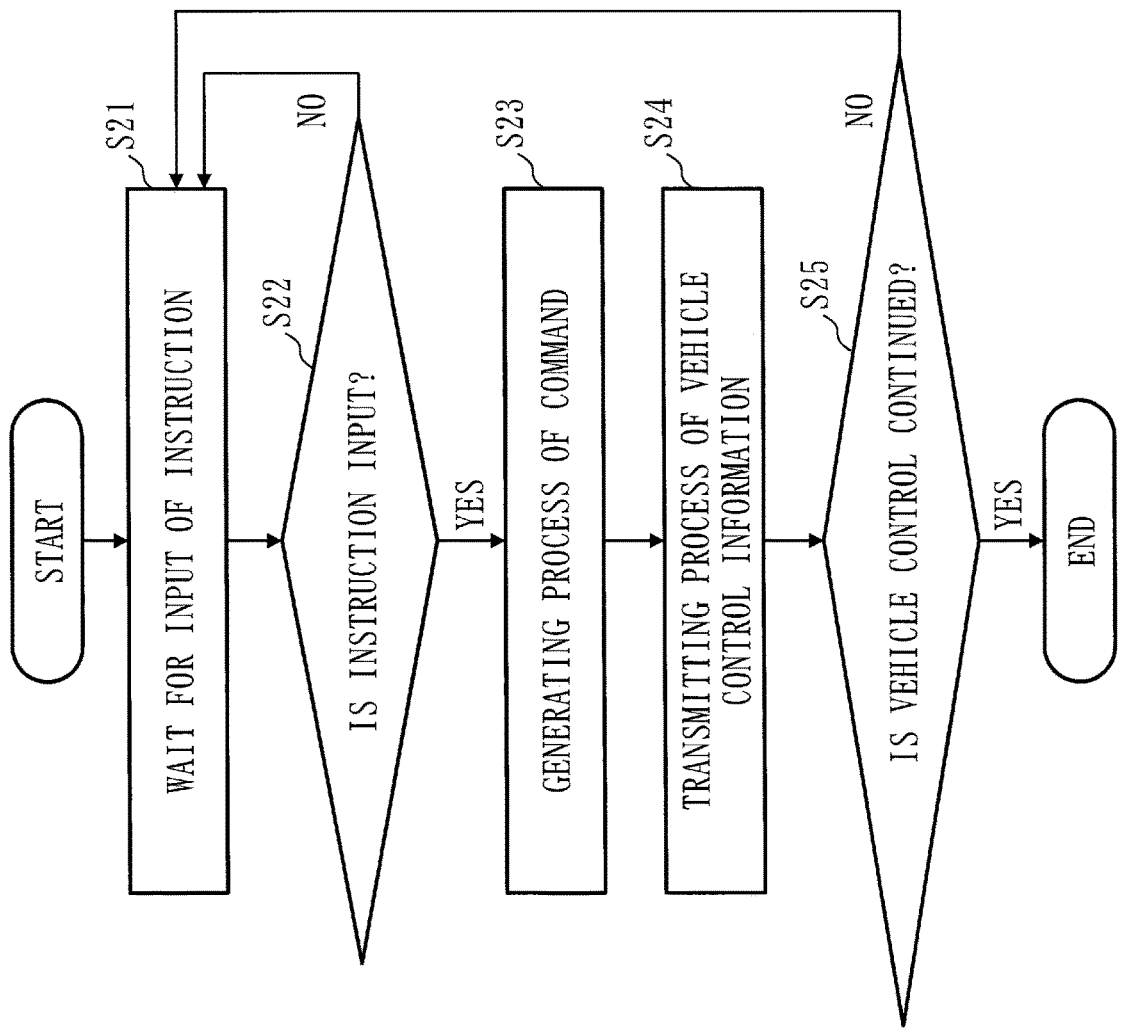
FIG. 16 is a flowchart illustrating an operation example of the monitoring device according to the first embodiment.

FIG. 16 is a flowchart illustrating procedures of the monitoring device 31 from acquiring an instruction from the manager 300 to transmitting vehicle control information.

In Step S21, the control instruction unit 104 waits for input of an instruction from the manager 300.

When an instruction is input from the manager 300 via the display operation device 32 and the display operation interface 16 (YES in Step S22), the control instruction unit 104 generates a command in Step S23.

As described above, when the instruction from the manager 300 is an instruction for stopping a certain autonomous driving vehicle 41, the control instruction unit 104 generates a stop command. When the instruction from the manager 300 is an instruction for moving a certain autonomous driving vehicle 41, the control instruction unit 104 generates a move command. When the instruction from the manager 300 is an instruction for stopping all the autonomous driving vehicles 41, the control instruction unit 104 generates a complete stop command.

Further, as described above, when the instruction from the manager 300 is an instruction for stopping a certain autonomous driving vehicle 41, the control instruction unit 104 acquires geographical coordinates of the current position of the autonomous driving vehicle 41 from the display operation device 32 via the display operation interface 16. Next, the control instruction unit 104 specifies a wireless communication device 22 that is arranged in the vicinity of the geographical coordinates of the current position of the autonomous driving vehicle 41 acquired from the display operation device 32. The control instruction unit 104 then outputs the identifier of the specified wireless communication device 22 and a stop command to the movement control unit 105.

Further, when the instruction from the manager 300 is an instruction for moving a certain autonomous driving vehicle 41, the control instruction unit 104 acquires geographical coordinates of the current position of the autonomous driving vehicle 41, geographical coordinates of the movement destination of the autonomous driving vehicle 41, and geographical coordinates of one or more middle points between the current position and the movement destination of the autonomous driving vehicle 41 from the display operation device 32 via the display operation interface 16. Next, the control instruction unit 104 specifies the wireless communication device 22 that is arranged in the vicinity of the geographical coordinates of the current position of the autonomous driving vehicle 41 acquired from the display operation device 32. Subsequently, the control instruction unit 104 outputs the identifier of the specified wireless communication device 22, the geographical coordinates of the movement destination, the geographical coordinates of the middle point, and a move command to the movement control unit 105.

Further, when the instruction from the manager 300 is an instruction for stopping all the autonomous driving vehicles 41, the control instruction unit 104 extracts identifiers of all the wireless communication devices 22 arranged in the parking lot 200. The control instruction unit 104 then outputs the identifiers of all the wireless communication devices 22 and a complete stop command to the movement control unit 105.

Next, in Step S24, the movement control unit 105 transmits vehicle control information including a command output from the control instruction unit 104 to the wireless communication device 22.

Specifically, when a stop command and an identifier of the wireless communication device 22 are output from the control instruction unit 104, the movement control unit 105 transmits vehicle control information including the stop command to a wireless communication device 22 that corresponds to the identifier output from the control instruction unit 104.

Further, when a move command, an identifier of the wireless communication device 22, geographical coordinates of a movement destination, and geographical coordinates of a middle point are output from the control instruction unit 104, the movement control unit 105 transmits vehicle control information including the move command, the geographical coordinates of the movement destination, and the geographical coordinates of the middle point to a wireless communication device 22 that corresponds to the identifier output from the control instruction unit 104.

Further, when a complete stop command and identifiers of all the wireless communication devices 22 are output, the movement control unit 105 transmits vehicle control information including the complete stop command to all the wireless communication devices 22.

In Step S25, the control instruction unit 104 determines whether control of the autonomous driving vehicle 41 is continued. When the control of the autonomous driving vehicle 41 is continued, the processes in Steps S21 to S24 are performed repeatedly.

As described above, the monitoring device 31 executes traveling control of the autonomous driving vehicle 41 according to the instruction from the manager 300.

*Descriptions of Effects of Embodiment*

In the present embodiment, the monitoring device 31 sets a priority to each of a plurality of pieces of facility-sensor image data obtained by a plurality of facility sensor devices 21 installed in the parking facility 20, and displays the plurality of pieces of facility-sensor image data according to the priority in a display mode with better visibility for the manager 300. Accordingly, according to the present embodiment, the manager 300 can monitor the traveling status of the autonomous driving vehicle 41 while paying attention to facility-sensor image data with a high priority. Therefore, in the present embodiment, one manager 300 can perform driving assistance for a plurality of autonomous driving vehicles 41, and accidents caused by autonomous driving vehicles in the parking facility 20 can be effectively prevented.

Second Embodiment

The monitoring device 31 according to a second embodiment uses not only the facility sensor device 21 installed in the parking facility 20 but also image data obtained by a sensor device incorporated in the autonomous driving vehicle 41. With this configuration, the manager 300 can perform driving assistance for the autonomous driving vehicle 41 more effectively.

In the present embodiment, differences from the first embodiment are mainly explained.

Matters not explained in the following descriptions are identical to those in the first embodiment.

*Descriptions of Operations*

Also in the present embodiment, the overall configuration of the parking-lot management system is as illustrated in FIG. 1.

Figure 17:
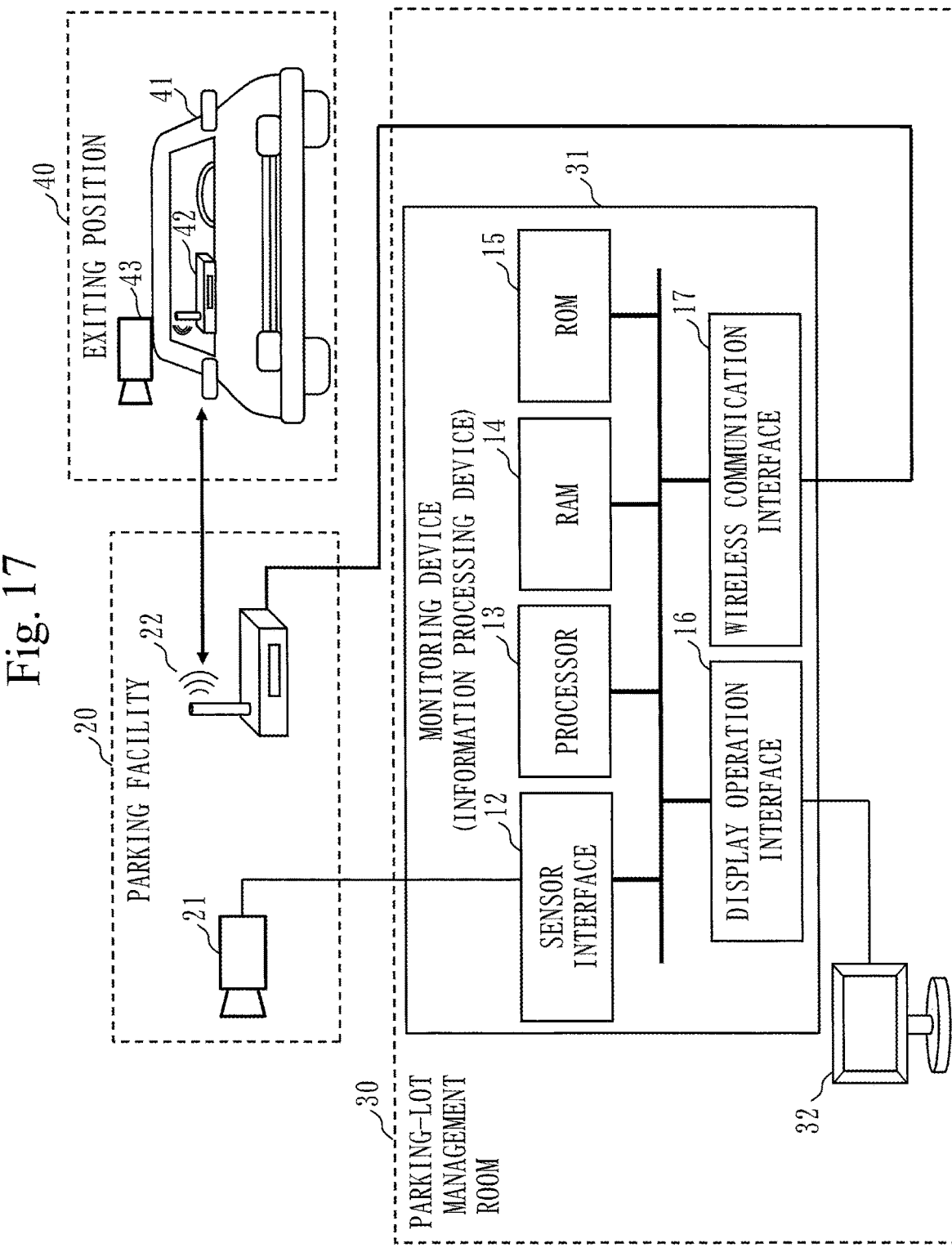
FIG. 17 is a diagram illustrating a hardware configuration example of a parking-lot management system according to a second embodiment.

FIG. 17 illustrates a hardware configuration example of a parking-lot management system according to the present embodiment.

In FIG. 17, as compared to the hardware configuration in FIG. 2, a vehicle sensor device 43 is incorporated in the autonomous driving vehicle 41. The vehicle sensor device 43 is a camera sensor, an infrared sensor, an optical laser sensor, a millimeter-wave radar sensor, an ultrasonic sensor, or the like.

Image data (hereinafter, vehicle-sensor image data) obtained by the vehicle sensor device 43 is transmitted to the wireless communication device 22 by the wireless communication device 42.

The wireless communication device 22 transmits the vehicle-sensor image data to the monitoring device 31.

In the monitoring device 31, the sensor interface 12 receives the vehicle-sensor image data.

In FIG. 17, constituent elements other than the vehicle sensor device 43 are identical to those illustrated in FIG. 2, and thus descriptions thereof are omitted.

Figure 18:
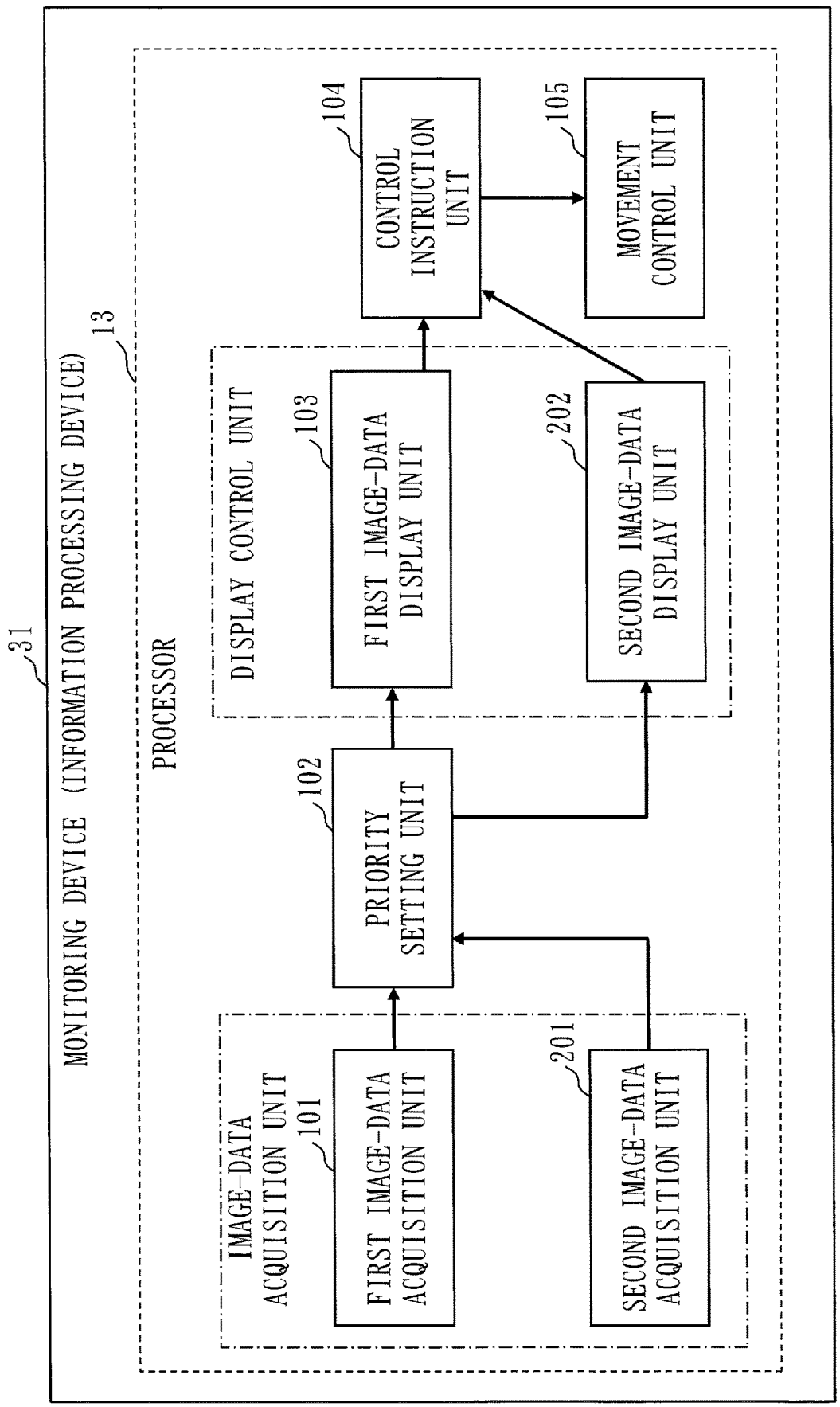
FIG. 18 is a diagram illustrating a functional configuration example of a monitoring device according to the second embodiment.

FIG. 18 illustrates a functional configuration example of the monitoring device 31 according to the present embodiment.

In FIG. 18, as compared to the functional configuration example in FIG. 3, a second image-data acquisition unit 201 and a second image-data display unit 202 are added.

Similarly to the first image-data acquisition unit 101, the priority setting unit 102, the first image-data display unit 103, the control setting unit 104, and the movement control unit 105, the second image-data acquisition unit 201 and the second image-data display unit 202 are realized by a program.

The second image-data acquisition unit 201 acquires a plurality of pieces of vehicle-sensor image data transmitted from a plurality of vehicle sensor devices 43 via the sensor interface 12.

Figure 19:
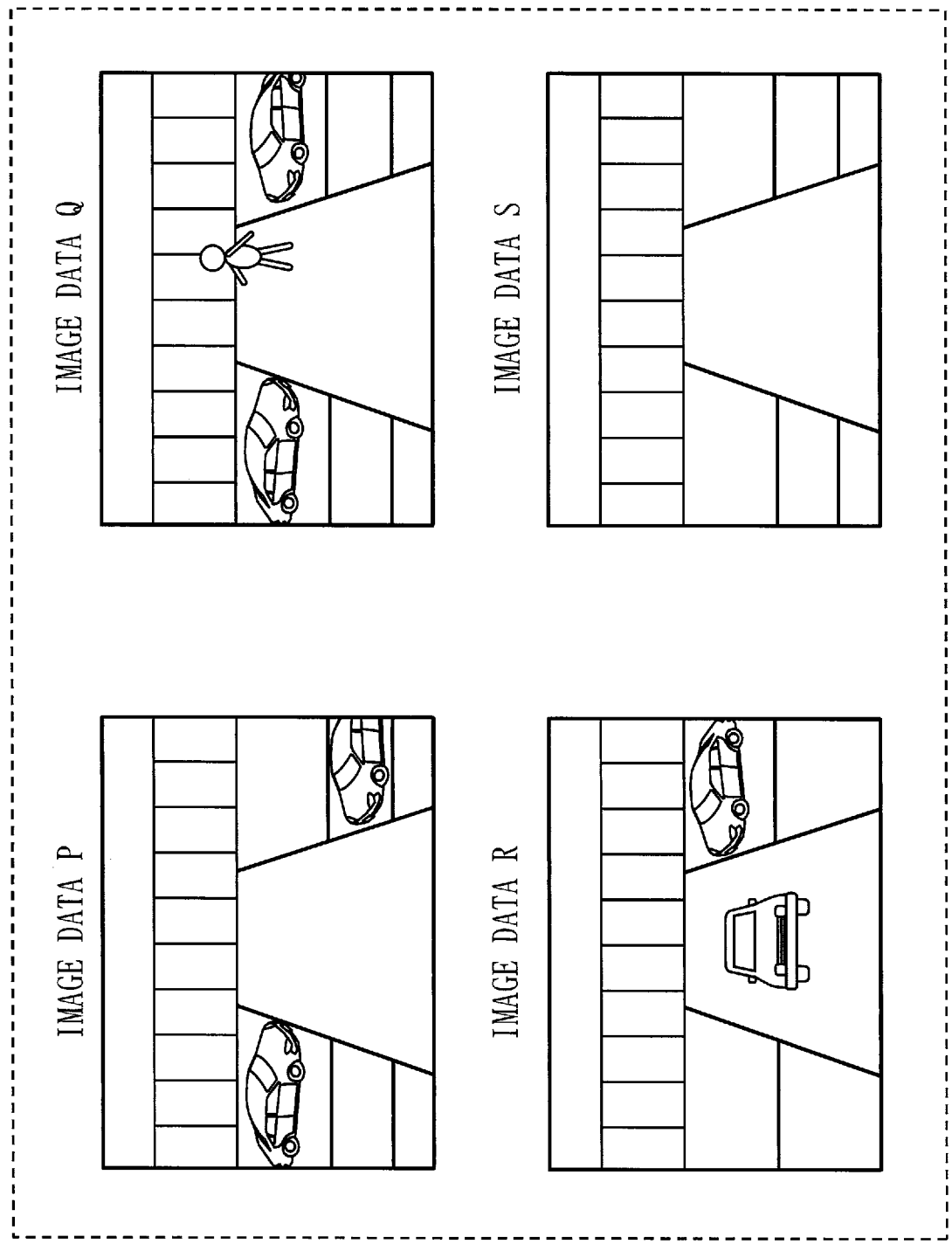
FIG. 19 is a diagram illustrating an example of vehicle-sensor image data according to the second embodiment.

FIG. 19 illustrates an example of vehicle-sensor image data when the vehicle sensor device 43 is a camera sensor. Image data P, image data Q, image data R, and image data S are captured images captured by vehicle sensor devices 43 arranged in different autonomous driving vehicles 41.

In the image data P, there are parked vehicles on the left and right sides of an autonomous driving vehicle 41 having incorporated therein a vehicle sensor device 43 that has captured the image data P. In the image data Q, a pedestrian is walking in front of the autonomous driving vehicle 41 having incorporated therein the vehicle sensor device 43 that has captured the image data Q. In the image data R, there is another vehicle traveling in front of an autonomous driving vehicle 41 having incorporated therein a vehicle sensor device 43 that has captured the image R. In the image data S, there is no other vehicle or no pedestrian around an autonomous driving vehicle 41 having incorporated therein a vehicle sensor device 43 that has captured the image data S.

As the vehicle sensor device 43, an infrared sensor, an optical laser sensor, a millimeter-wave radar sensor, an ultrasonic sensor, or the like can be used. An infrared sensor and an optical laser sensor are as described in the first embodiment, and these sensors can measure the presence/absence of pedestrians and a three-dimensional shape of the parking facility 20. A millimeter-wave radar sensor can detect, by using radio waves in a millimeter-wave band, obstacles such as vehicles and pedestrians even in a fog, in the rain, or in the snow. An ultrasonic sensor is cheaper as compared to other sensors and can detect obstacles at close range. In this manner, the second image-data acquisition unit 201 can acquire obstacles (pedestrians or other vehicles) around the autonomous driving vehicle 41, the status in the parking lot 200 around the autonomous driving vehicle 41, a three-dimensional shape around the autonomous driving vehicle 41, and the like.

In the present embodiment, the first image-data acquisition unit 101 and the second image-data acquisition unit 201 correspond to an image-data acquisition unit. Further, the processes performed by the first image-data acquisition unit 101 and the second image-data acquisition unit 201 correspond to an image-data acquiring process.

The priority setting unit 102 according to the present embodiment sets a priority to each of a plurality of pieces of vehicle-sensor image data acquired from the second image-data acquisition unit 201. The priority is a priority for displaying vehicle-sensor image data to the manager 300. The vehicle-sensor image data is displayed in a higher visibility display mode as its priority is higher. Similarly to the first embodiment, the priority setting unit 102 calculates the priority based on the degree of danger.

In the example of the image data P, the image data Q, the image data R, and the image data S in FIG. 19, the priority setting unit 102 sets the degree of danger of the image data Q in which there is a pedestrian in front of the autonomous driving vehicle 41 to be the highest. The priority setting unit 102 then sets the degree of danger of the image data R in which there is another vehicle traveling in front of the autonomous driving vehicle 41 to be the second highest. The priority setting unit 102 sets the degree of danger of the image data P in which there are parked vehicles on the left and right sides of the autonomous driving vehicle 41 to be the third highest. Subsequently, the priority setting unit 102 sets the degree of danger of the image data S in which there is no pedestrian or no other vehicle around the autonomous driving vehicle 41 to be the lowest.

As a result, the priority of the image data in FIG. 19 descends in order of the image data Q→the image data R→the image data P→the image data S.

Further, similarly to the first embodiment, the priority setting unit 102 may set the degree of danger of vehicle-sensor image data of autonomous driving vehicles which stops traveling on a street to be high.

Further, it is possible that the priority setting unit 102 analyzes a plurality of pieces of facility-sensor image data and a plurality of pieces of vehicle-sensor image data, estimates the degree of danger of the area that is shown in each vehicle-sensor image data, and sets a priority to each vehicle-sensor image data based on the estimated degree of danger.

Further, it is possible that the priority setting unit 102 analyzes a plurality of pieces of facility-sensor image data and a plurality of pieces of vehicle-sensor image data, estimates the degree of danger of the area that is shown in each facility-sensor image data, and sets a priority to each facility-sensor image data based on the estimated degree of danger.

The priority setting unit 102 can detect the presence/absence of obstacles (other vehicles and pedestrians) around the autonomous driving vehicle 41 and the positions of the obstacles by using either vehicle-sensor image data or using facility-sensor image data. Therefore, it is possible that the priority setting unit 102 estimates a degree of danger and sets a priority by referring to both vehicle-sensor image data and facility-sensor image data.

Meanwhile, even when the same obstacle is shown in vehicle-sensor image data and facility-sensor image data, there is a case where a recognition result of the obstacle using the vehicle-sensor image data and a recognition result of the obstacle using the facility-sensor image data are different. The difference between these recognition results is described using a bird's-eye view of the parking lot 200 illustrated in FIG. 20.

Figure 20:
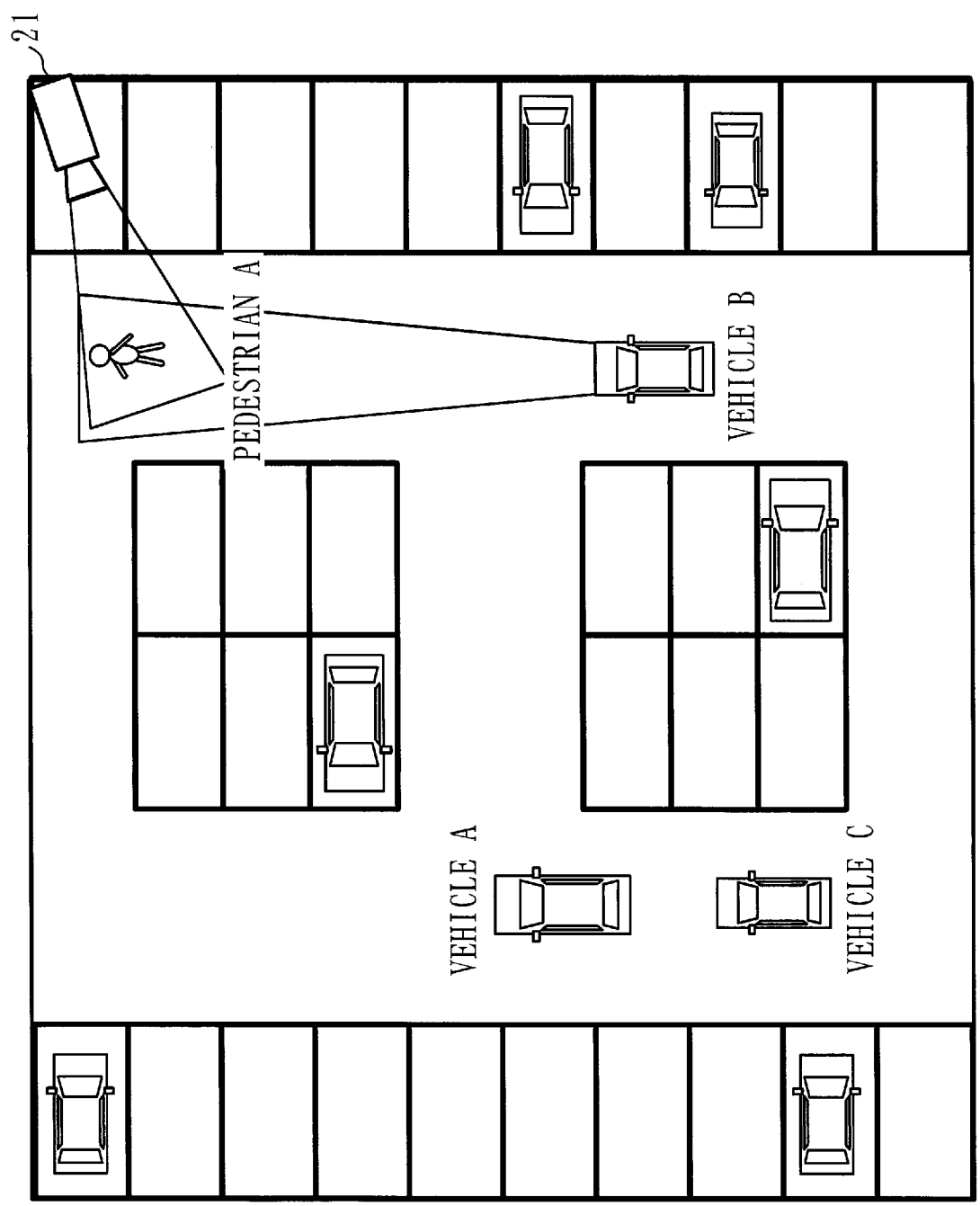
FIG. 20 is a diagram illustrating an example of a bird's-eye view of a parking lot according to the second embodiment.

The vehicle sensor device 43 incorporated in a vehicle B in FIG. 20 and the facility sensor device 21 installed in the parking facility 20 capture a pedestrian A as the same obstacle.

Figure 21:
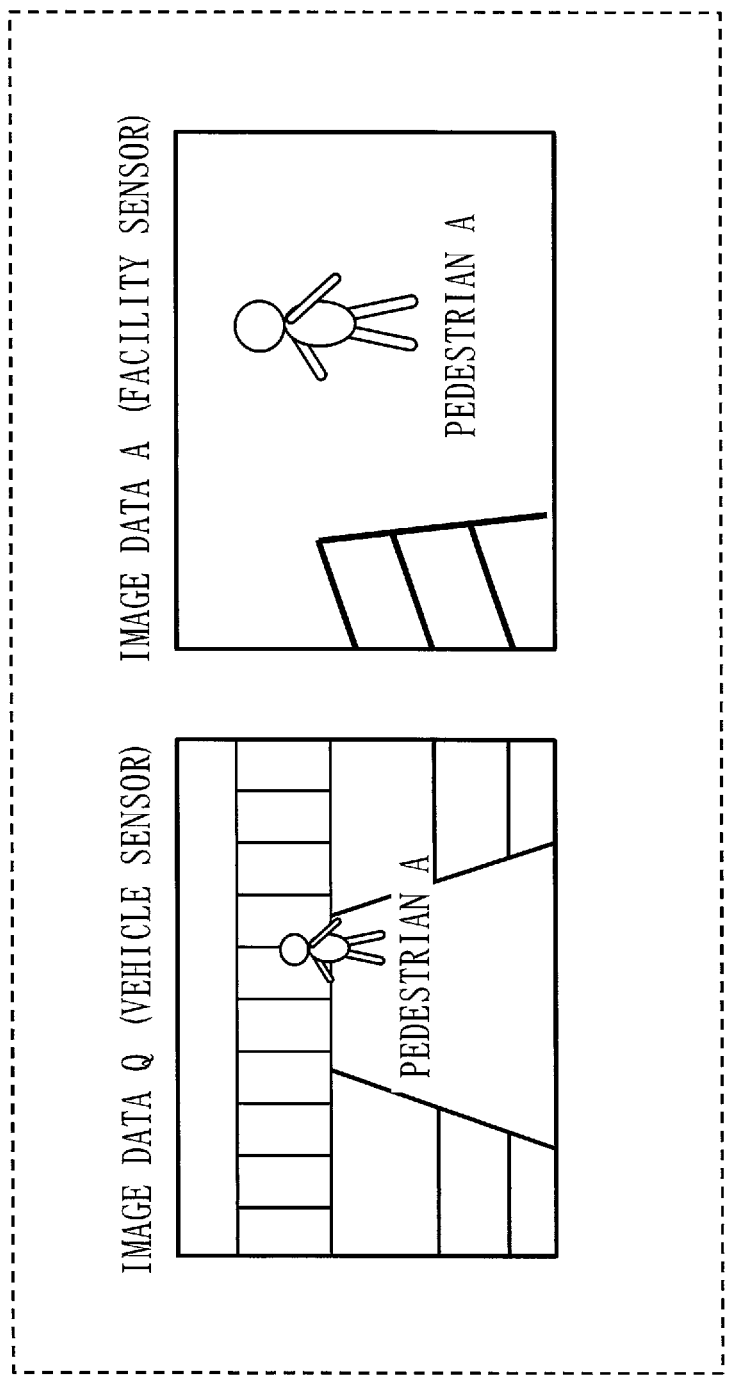
FIG. 21 illustrates an example of vehicle-sensor image data and facility-sensor image data according to the second embodiment.

However, since the capturing direction of the vehicle sensor device 43 and that of the facility sensor device 21 are different, the captured images are also different as illustrated in FIG. 21. Therefore, there is a possibility that erroneous recognition occurs in either analysis of the image data P or analysis of the image data A. The image range of the pedestrian in the image data P in FIG. 21 is smaller than the image range of the pedestrian in the image A. Performing image recognition of an object in a small image range is generally difficult. Therefore, although the facility sensor device 21 can correctly detect a pedestrian, there is a possibility that the vehicle sensor device 43 of the vehicle B cannot detect the pedestrian. In this case, by analyzing both the image data P and the image data A, the priority setting unit 102 can correctly recognize a fact that a pedestrian is walking, and can estimate the degree of danger correctly. When obstacles on the traveling route are undetected by the autonomous driving vehicle 41, the degree of danger is very high. Therefore, when the analysis result with regard to vehicle-sensor image data and the analysis result with regard to facility-sensor image data are different, the priority setting unit 102 may set the priority of the vehicle-sensor image data higher.

As described above, the priority setting unit 102 can calculate the priority of image data by referring to vehicle-sensor image data obtained by vehicle sensor devices 43 incorporated in a plurality of autonomous driving vehicles 41 and facility-sensor image data obtained by a plurality of facility sensor devices 21 installed in the parking facility 20.

The second image-data display unit 202 decides a display mode at the time of displaying a plurality of pieces of vehicle-sensor image data according to the priority set by the priority setting unit 102. The second image-data display unit 202 then displays, via the display operation interface 16, a plurality of pieces of vehicle-sensor image data on the display operation device 32 in the decided display mode.

In the present embodiment, the first image-data display unit 103 and the second image-data display unit 202 correspond to a display control unit. Further, the processes performed by the first image-data display unit 103 and the second image-data display unit 202 correspond to a display control process.

Figure 22:
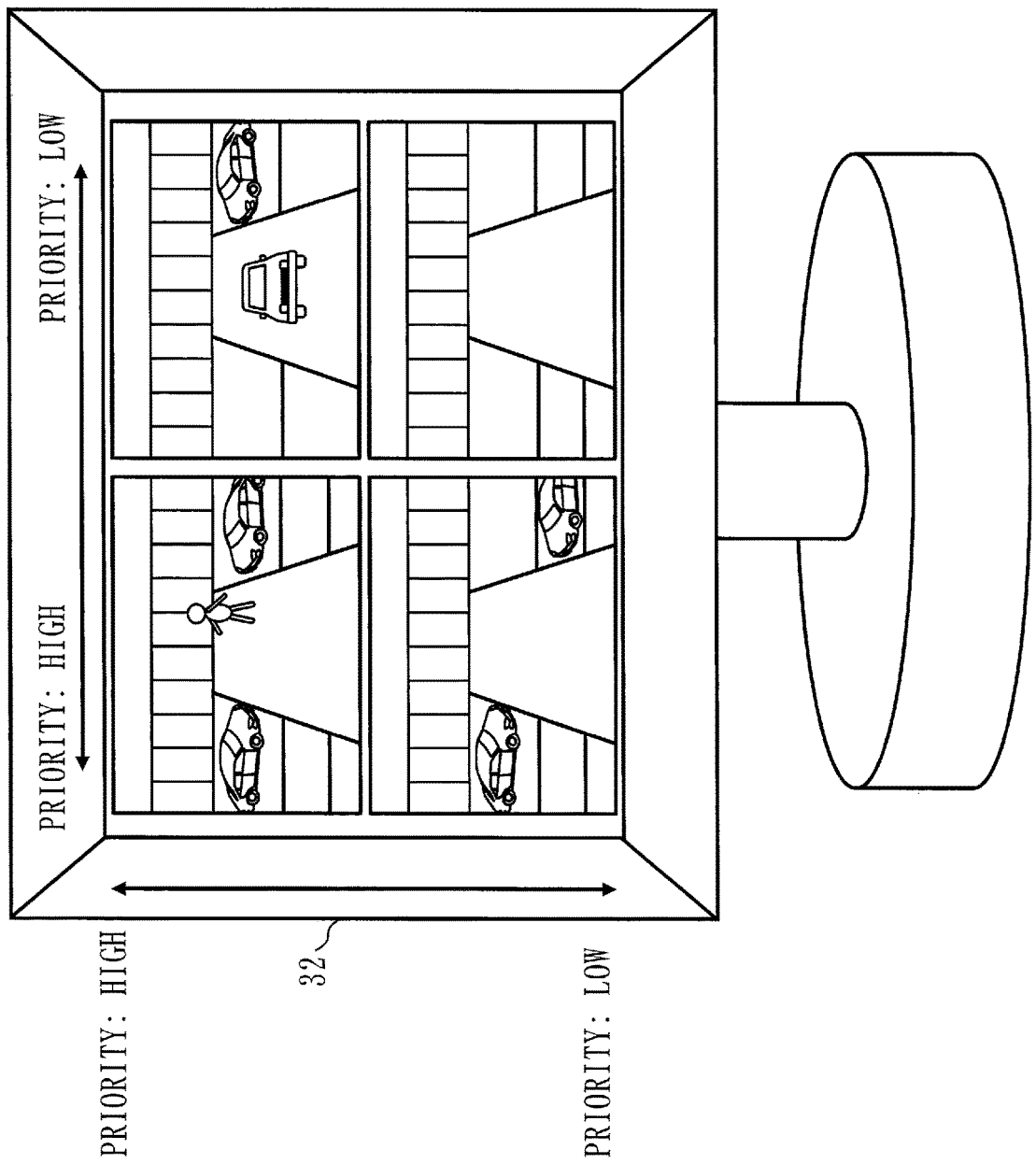
FIG. 22 is a diagram illustrating a display example of the vehicle-sensor image data according to the second embodiment.

FIG. 22 illustrates a display example of vehicle-sensor image data.

An example of displaying pieces of vehicle-sensor image data in order of priority on the display operation device 32 is illustrated in FIG. 22. In the example of FIG. 22, vehicle-sensor image data with the highest priority is displayed in the upper left area of the screen. Vehicle-sensor image data with the second highest priority is displayed in the upper right area. Vehicle-sensor image data with the third highest priority is displayed in the lower left area. Vehicle-sensor image data with the lowest priority is displayed in the lower right area.

Further, when the monitoring device 31 has received n pieces of vehicle-sensor image data obtained by n (n≥3) vehicle sensor devices 43, it is possible that the second image-data display unit 202 selects m (2≤m<n) pieces of vehicle-sensor image data based on the priority to display only m pieces of vehicle-sensor image data on the display operation device 32.

In FIG. 22, while four pieces of vehicle-sensor image data are displayed in the same size, the display sizes of the pieces of vehicle-sensor image data may be changed according to the priority.

Figure 23:
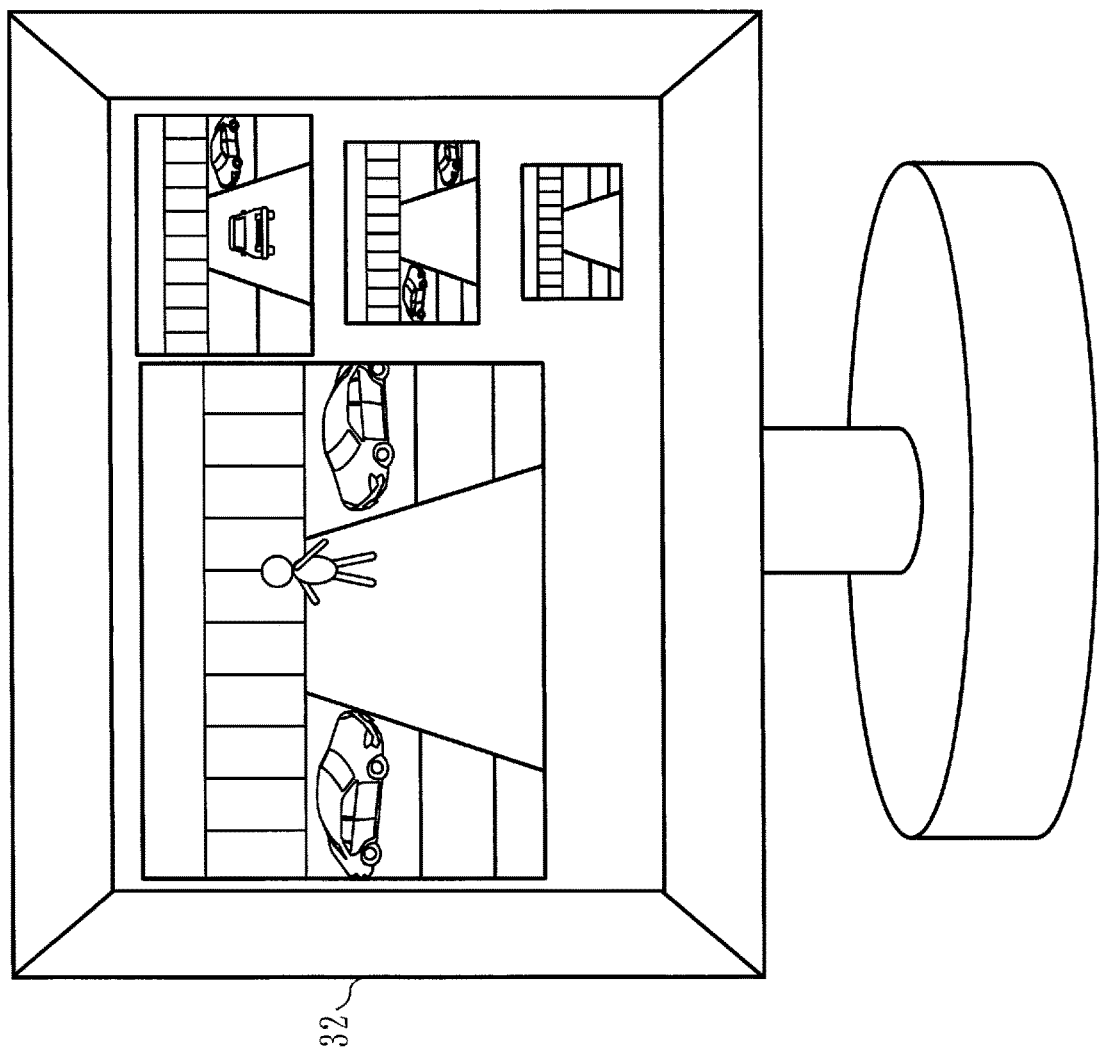
FIG. 23 is a diagram illustrating a display example of the vehicle-sensor image data according to the second embodiment.

FIG. 23 illustrates an example in which the display sizes of pieces of vehicle-sensor image data are changed according to the priority.

In the example of FIG. 23, vehicle-sensor image data with a higher priority has a larger display size.

Further, the second image-data display unit 202 may generate a display screen that cooperates with the display screen generated by the first image-data display unit 103 or the bird's-eye view generation unit 106 illustrated in FIG. 8.

Figure 24:
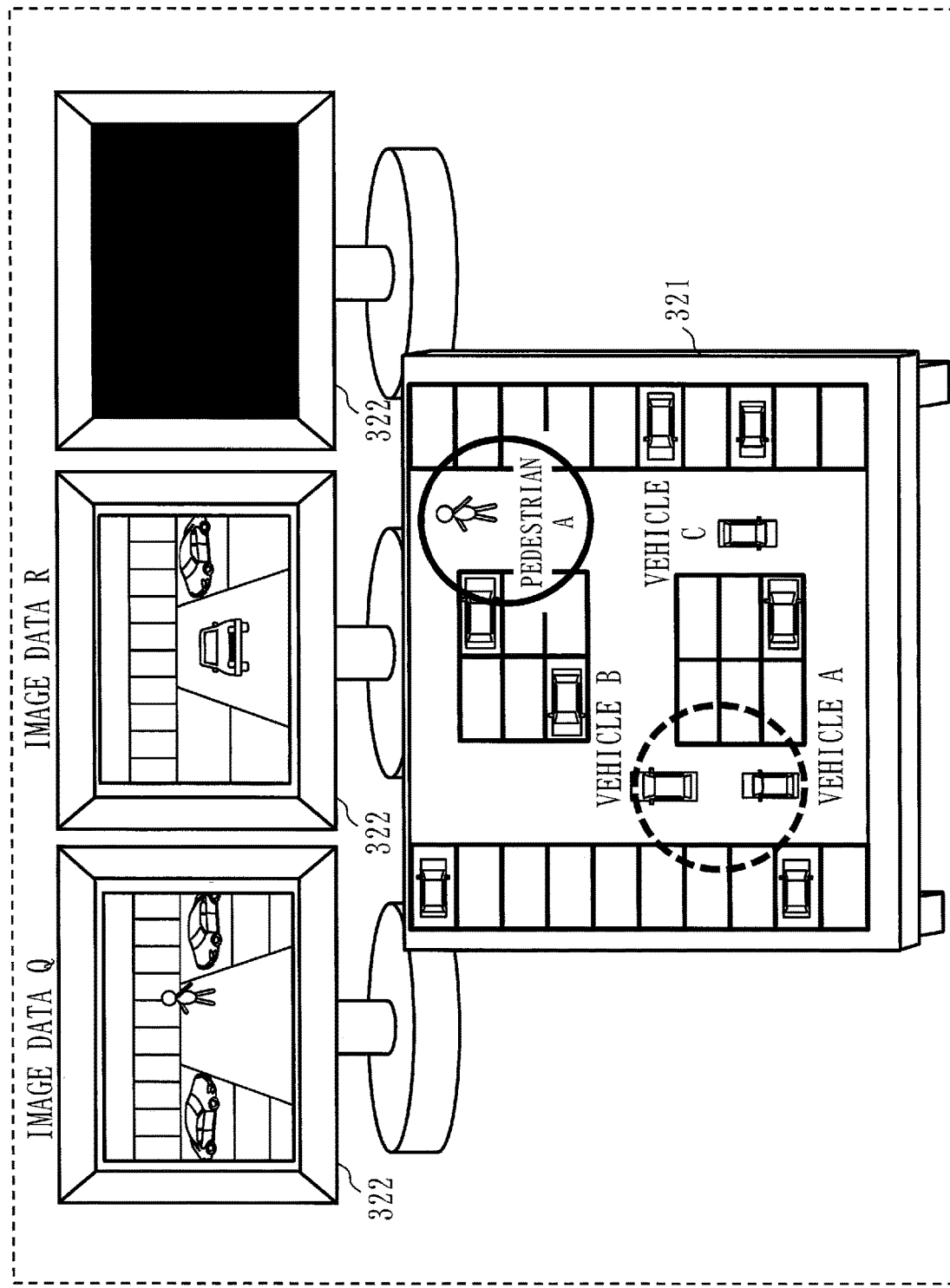
FIG. 24 is a diagram illustrating a display example of the vehicle-sensor image data and the facility-sensor image data according to the second embodiment.

FIG. 24 illustrates an example in which the second image-data display unit 202 displays vehicle-sensor image data while cooperating with a bird's-eye view generated by the bird's-eye view generation unit 106.

In FIG. 24, a bird's-eye view of the parking lot 200 is displayed on a table-type display operation device 321, and a plurality of pieces of vehicle-sensor image data are displayed on a plurality of display operation devices 322.

The first image-data display unit 103 may insert vehicle-sensor image data in the bird's-eye view.

In the bird's-eye view, similarly to the first embodiment, a portion having a high priority is highlighted. Further, the second image-data display unit 202 may display vehicle-sensor image data corresponding to the portion highlighted in the bird's-eye view on the display operation devices 322.

As described above, the monitoring device 31 preferentially displays vehicle-sensor image data of an autonomous driving vehicle 41 with a high degree of danger on the display operation device 32. Accordingly, the manager 300 can monitor the traveling status of the autonomous driving vehicle 41 while paying attention to vehicle-sensor image data with a high priority.

*Descriptions of Operations*

Next, operation examples of the monitoring device 31 according to the present embodiment are described.

FIG. 25 is a flowchart illustrating procedures of the monitoring device 31 from acquiring facility-sensor image data to displaying the facility-sensor image data.

In Step S31, the second image-data acquisition unit 201 acquires vehicle-sensor image data obtained by the vehicle sensor device 43.

Next, in Step S32, the priority setting unit 102 calculates the priority of the vehicle-sensor image data acquired in Step S31. As described above, the priority setting unit 102 calculates the degree of danger based on the congestion of vehicles, the presence/absence of pedestrians, the presence/absence of autonomous driving vehicles which stop their traveling, and the like, and sets the priority based on the calculated degree of danger.

Next, in Step S33, the second image-data display unit 202 decides a display mode in which vehicle-sensor image data is displayed on the display operation device 32 according to the priority set in Step S32, and generates a display screen in the decided display mode. The second image-data display unit 202 then outputs the generated display screen to the display operation device 32 via the display operation interface 16.

That is, when the vehicle-sensor image data is displayed as illustrated in FIG. 22, the second image-data display unit 202 decides the display mode according to the priority, such as displaying image data Q with the highest priority in the upper left area and displaying image data R with the second highest priority in the upper right area.

Further, when the vehicle-sensor image data is displayed as illustrated in FIG. 23, the second image-data display unit 202 decides the display mode according to the priority, such as displaying the image data Q with the highest priority in the largest size and displaying the image data R with the second highest priority in a size smaller than that of the image data Q on the right side of the image data R.

In Step S34, the second image-data display unit 202 determines whether displaying of the vehicle-sensor image data is continued. When the displaying of the vehicle-sensor image data is continued, the processes in Steps S31 to S33 are performed repeatedly.

As described above, the monitoring device 31 sets the priority to each of a plurality of pieces of vehicle-sensor image data obtained by a plurality of vehicle sensor devices 43 incorporated in a plurality of autonomous driving vehicles 41, and displays the plurality of pieces of vehicle-sensor image data according to the set priority in a display mode with better visibility for the manager 300.

*Descriptions of Effects of Embodiment*

According to the present embodiment, the manager 300 can monitor the traveling status of the autonomous driving vehicle 41 while paying attention to vehicle-sensor image data with a high priority. Therefore, in the present embodiment, one manager 300 can perform driving assistance for a plurality of autonomous driving vehicles 41, and accidents caused by autonomous driving vehicles in the parking facility 20 can be effectively prevented.

While embodiments of the present invention have been described above, two of these embodiments can be carried out by combining them to one another.

Alternatively, one of these embodiments can be partially carried out.

Alternatively, two of these embodiments can be carried out by partially combining them to one another.

The present invention is not limited to these embodiments and can be variously modified as necessary.

While control of autonomous traveling vehicles in the parking facility 20 has been described above, the monitoring device 31 according to the present embodiment can be applied to control of autonomous traveling vehicles in facilities such as a warehouse, a plant or the like.

*Descriptions of Hardware Configuration*

Finally, supplementary descriptions of a hardware configuration of the monitoring device 31 are provided.

The processor 13 is an IC (Integrated Circuit) that performs processing.

The processor 13 is a CPU (Central Processing Unit), a DSP (Digital Signal Processor), or the like.

An OS (Operating System) is also stored in the ROM 15.

At least a part of the OS is loaded into the RAM 14 and read by the processor 13. The processor 13 executes at least a part of the OS.

The processor 13 executes programs that realize the functions of the first image-data acquisition unit 101, the priority setting unit 102, the first image-data display unit 103, the control instruction unit 104, the movement control unit 105, the bird's-eye view generation unit 106, the second image-data acquisition unit 201, and the second image-data display unit 202 while executing at least a part of the OS.

With execution of the OS by the processor 13, task management, memory management, file management, communication control, and the like are performed.

Further, the monitoring device 31 may include a plurality of processors that substitute the processor 13. These processors share execution of the programs that realize the functions of the first image-data acquisition unit 101, the priority setting unit 102, the first image-data display unit 103, the control instruction unit 104, the movement control unit 105, the bird's-eye view generation unit 106, the second image-data acquisition unit 201, and the second image-data display unit 202. Each of the processors is an IC that performs processing similarly to the processor 13.

Further, at least any one of pieces of information, data, signal values, and variable values indicating results of processing by the first image-data acquisition unit 101, the priority setting unit 102, the first image-data display unit 103, the control instruction unit 104, the movement control unit 105, the bird's-eye view generation unit 106, the second image-data acquisition unit 201, and the second image-data display unit 202 is stored at least in any one of the RAM 14 and a register and a cache memory in the processor 13.

Further, the programs that realize the functions of the first image-data acquisition unit 101, the priority setting unit 102, the first image-data display unit 103, the control instruction unit 104, the movement control unit 105, the bird's-eye view generation unit 106, the second image-data acquisition unit 201, and the second image-data display unit 202 may be stored in portable storage medium such as a magnetic disk, a flexible disk, an optical disk, a compact disk, a Blue-ray (registered trademark) disk, and a DVD.

The "unit" of the first image-data acquisition unit 101, the priority setting unit 102, the first image-data display unit 103, the control instruction unit 104, the movement control unit 105, the bird's-eye view generation unit 106, the second image-data acquisition unit 201, and the second image-data display unit 202 may be replaced with "circuit", "step", "procedure", or "process".

The monitoring device 31 may be implemented by an electronic circuit such as a logic IC (Integrated Circuit), a GA (Gate Array), an ASIC (Application Specific Integrated Circuit), and an FPGA.

In this case, each of the first image-data acquisition unit 101, the priority setting unit 102, the first image-data display unit 103, the control instruction unit 104, the movement control unit 105, the bird's-eye view generation unit 106, the second image-data acquisition unit 201, and the second image-data display unit 202 is implemented as a part of an electronic circuit.

The processor and the electronic circuit described above are also collectively referred to as processing circuitry.

REFERENCE SIGNS LIST

12: sensor interface, 13: processor, 14: RAM, 15: ROM, 16: display operation interface, 17: wireless communication interface, 20: parking facility, 21: facility sensor device, 22: wireless communication device, 30: parking-lot management room, 31: monitoring device, 32: display operation device, 33: complete stop button, 40: exiting position, 41: autonomous driving vehicle, 42: wireless communication device, 43: vehicle sensor device, 101: first image-data acquisition unit, 102: priority setting unit, 103: first image-data display unit, 104: control instruction unit, 105: movement control unit, 106: bird's-eye view generation unit, 200: parking lot, 201: second image-data acquisition unit, 202: second image-data display unit, 300: manager, 400: driver

The invention claimed is:

1. An information processing device for monitoring autonomous driving vehicles conducting automatic parking in a parking facility, the device comprising:
   processing circuitry
      to acquire, from sensors positioned in the parking facility, a plurality of pieces of image data in which different areas in the parking facility in which an autonomous driving vehicle conducts autonomous traveling are shown;
      to analyze a status shown in each of the plurality of pieces of image data and to set a priority to each of the plurality of pieces of image data;
      to combine the plurality of pieces of image data to generate a bird's-eye view;
      to display the bird's-eye view with a highlight for portions of the bird's-eye view in which pieces of the acquired image data having a set priority that matches a predetermined condition is reflected; and
      instructs stopping or altering of a traveling of a monitored autonomous driving vehicle.

2. The information processing device according to claim 1, wherein the processing circuitry analyzes a status shown in each image data, estimates a degree of danger in an area that is shown in each image data, and sets a priority to each image data based on an estimated degree of danger.

3. The information processing device according to claim 2, wherein the processing circuitry
   acquires a plurality of pieces of image data in which different areas in a facility in which one or more autonomous driving vehicles conduct autonomous driving and one or more pedestrians walk are shown, and
   analyzes a status of an autonomous driving vehicle and a status of a pedestrian as a status shown in each image data, and estimates a degree of danger in an area that is shown in each image data.

4. The information processing device according to claim 1, wherein the processing circuitry acquires a plurality of pieces of image data generated by a plurality of sensor devices installed in a plurality of autonomous traveling vehicles that are present in the facility.

5. The information processing device according to claim 1, wherein the processing circuitry instructs stopping of traveling of the autonomous driving vehicle.

6. The information processing device according to claim 1, wherein the processing circuitry designates a traveling route and instructs traveling of the autonomous driving vehicle along the traveling route.

7. The information processing device according to claim 1, wherein the processing circuitry instructs, when there are a plurality of autonomous driving vehicles in the facility, stopping of traveling of the plurality of autonomous driving vehicles.

8. An information processing method monitoring autonomous driving vehicles conducting automatic parking in a parking facility, the method comprising:
   acquiring, from sensors positioned in the parking facility, a plurality of pieces of image data in which different areas in the parking facility in which an autonomous driving vehicle conducts autonomous driving are shown;
   analyzing a status shown in each of the plurality of pieces of image data and setting a priority to each of the plurality of pieces of image data;
   combining the plurality of pieces of image data to generate a bird's-eye view;
   displaying the bird's-eye view with highlighting for portions of the bird's-eye view in which pieces of the acquire image data having a set priority that matches a predetermined condition is reflected; and
   instructing stopping or altering of traveling of a monitored autonomous driving vehicle.

9. A non-transitory computer readable medium storing an information processing program for monitoring autonomous driving vehicles conducting automatic parking in a parking facility, the information processing program causing a computer to execute:
- an image-data acquiring process of acquiring, from sensors positioned in the parking facility, a plurality of pieces of image data in which different areas in the parking facility in which an autonomous driving vehicle conducts autonomous driving are shown;
- a priority setting process of analyzing a status shown in each of the plurality of pieces of image data and setting a priority to each of the plurality of pieces of image data;
- a display control process of combining the plurality of pieces of image data to generate a bird's-eye view, and displaying the bird's-eye view with highlighting for portions of the bird's-eye view in which pieces of the acquired image data having a set priority that matches a predetermined condition is reflected; and
- an instruction process of stopping or altering traveling of a monitored autonomous driving vehicle.

* * * * *